(12) United States Patent  
St-Pierre et al.

(10) Patent No.: US 9,272,852 B2  
(45) Date of Patent: Mar. 1, 2016

(54) BOARD STACKING APPARATUS

(71) Applicant: NOVILCO INC., St-Felicien (CA)

(72) Inventors: Michel St-Pierre, Saint-Prime (CA); Isabelle St-Pierre, St-Felicien (CA); Eric Vallee, Dolbeau-Mistassini (CA)

(73) Assignee: NOVILCO INC., St-Felicien, Quebec (CA)

( * ) Notice: Subject to any disclaimer, the term of this patent is extended or adjusted under 35 U.S.C. 154(b) by 230 days.

(21) Appl. No.: 13/838,974

(22) Filed: Mar. 15, 2013

(65) Prior Publication Data

US 2013/0216349 A1   Aug. 22, 2013

Related U.S. Application Data

(63) Continuation-in-part of application No. PCT/CA2011/001388, filed on Dec. 20, 2011.

(60) Provisional application No. 61/425,151, filed on Dec. 20, 2010.

(51) Int. Cl.
  *B65G 57/22* (2006.01)
  *B65G 57/24* (2006.01)

(52) U.S. Cl.
  CPC .............. *B65G 57/24* (2013.01); *B65G 57/245* (2013.01); *B65G 2201/0282* (2013.01)

(58) Field of Classification Search
  CPC .......... B65G 57/24; B65G 2201/0282; B65G 57/16; B65G 57/245; B65G 57/18
  USPC .......... 414/791.6, 792.7, 789.5, 744.1, 790.8, 414/790.9, 791, 791.4, 791.7, 791.8, 791.9, 414/792, 792.1, 792.5, 792.6, 794, 794.2; 198/426, 429, 468.01, 621.3, 750.8, 198/774.3; 271/189, 211
  See application file for complete search history.

(56) References Cited

U.S. PATENT DOCUMENTS 2,928,559 A   3/1960   Mosely
3,703,965 A   11/1972  Coats
(Continued)

FOREIGN PATENT DOCUMENTS

CA    578589 A    6/1959
CA    824503 A    10/1969
(Continued)

OTHER PUBLICATIONS

International Search Report for corresponding International Patent Application No. PCT/CA2011/001388 mailed Feb. 22, 2012.

*Primary Examiner* — Saul Rodriguez
*Assistant Examiner* — Lynn Schwenning
(74) *Attorney, Agent, or Firm* — Merchant & Gould P.C.

(57) ABSTRACT

A board stacking apparatus having one or more movable supports having at least two arms each, a rear stopper and a power assembly operatively connected to the movable support to move the same according to a layer stacking routine. The layer stacking routine includes positioning the movable support at a receiving position, maintaining the movable support in the receiving position while the boards are dispensed thereon, and moving the movable support in a rearward direction. The board stacking apparatus further comprises abutment components located proximate to and slightly below a board dispensing mechanism of the apparatus to support the receiving end of corresponding arms when in the receiving position.

27 Claims, 18 Drawing Sheets

(56) References Cited

U.S. PATENT DOCUMENTS

| | | | |
|---|---|---|---|
| 3,737,053 A * | 6/1973 | Lunden | 414/791.8 |
| 3,743,113 A * | 7/1973 | Eaton | B65G 57/18 414/789.5 |
| 3,904,046 A * | 9/1975 | Lunden | B65G 57/18 271/189 |
| 4,067,457 A | 1/1978 | Schiepe | |
| 4,274,781 A * | 6/1981 | Rysti | 414/794.1 |
| 4,384,814 A | 5/1983 | Moseley | |
| 4,679,381 A * | 7/1987 | Truninger | 53/447 |
| 4,799,847 A * | 1/1989 | Bodewein | B65H 29/16 271/211 |
| 5,613,827 A | 3/1997 | Vande Linde | |
| 6,752,586 B2 * | 6/2004 | Baumann | B65H 31/32 271/218 |
| 2003/0031550 A1 * | 2/2003 | Dube et al. | 414/789.5 |
| 2003/0091421 A1 * | 5/2003 | Piche et al. | 414/793.4 |
| 2005/0106000 A1 * | 5/2005 | Hogue et al. | 414/794.3 |
| 2010/0284776 A1 * | 11/2010 | Johansson et al. | 414/791.6 |

FOREIGN PATENT DOCUMENTS

| | | |
|---|---|---|
| CA | 896361 A | 3/1972 |
| CA | 976995 A1 | 10/1975 |
| CA | 976996 A1 | 10/1975 |
| CA | 1009673 A1 | 5/1977 |
| CA | 1121838 A1 | 4/1982 |
| CA | 2559649 A1 | 3/2008 |
| CA | 2703359 A1 | 11/2010 |
| EP | 0 020 287 A1 | 12/1980 |
| GB | 1 182 314 A | 2/1970 |

* cited by examiner

BOARD STACKING APPARATUS

RELATED APPLICATION

This is a continuation-in-part of PCT patent application PCT/CA2011/001388, filed Dec. 20, 2011, which claims priority of U.S. Provisional patent application No. 61/425,151, filed Dec. 20, 2010, which applications are incorporated herein by reference. To the extent appropriate, a claim of priority is made to each of the above disclosed applications.

FIELD OF THE INVENTION

The present invention relates to automated wood processing equipment and more particularly concerns a board stacking apparatus having an improved design.

BACKGROUND OF THE INVENTION

Over time, the mechanization of the processes in lumber mills has permitted an increase in the speed of the associated operations such as, but not limited to, sawing, edging, trimming, planning, stacking and bundling. However, as it is the case for every process including multiple operations, for the overall process to be effective, lumber need to flow smoothly between successive operations. If one of the operations is slower than the others, the entire production is slowed down accordingly. Nowadays, in many lumber mills, this bottleneck occurs at the stacking stage, the stacking of the boards being the most time consuming operation.

Stacking requires laying layers of boards or lumber on top of each other. The layers are formed of a fixed number of boards (normally having similar length and width). Layers can be spaced apart by sticks, which are placed perpendicularly to the boards and spaced apart horizontally. Sticks are usually placed either between each layers, as is most common for drying, or only at each N layers, where N is an integer smaller than the total number of layers in the stack, in order to increase the stability of the stack.

Conventional stacking apparatuses usually proceed by lifting a layer of boards formed on transfer chains and moving it forward over a forming stack, using mechanical arms or forks. Once the new board layer extends over the stack, the mechanical arms or forks are removed from under the board layer, in order to deposit the boards onto the stack. During this removal of the mechanical arms or forks, a stopper is usually provided in order to prevent the boards of the new layer from moving toward the transfer chains and keep them above the forming stack. Whenever sticks are needed, they are deposited on the top layer of the stack by a stick placing apparatus before the dropping of a new board layer.

Known stacking apparatuses can for example be found in U.S. Pat. Nos. 5,613,827 and 4,384,814, as well as Canadian patents CA2,559,649, CA1,009,673, CA976,996, CA976,995, CA896,361, CA824,503 and CA578,589.

Typical mechanisms generally require the displacement of the mechanical arms or forks in upward, forward, downward and backward directions, which arms often need to be displaced over distances of several meters. Consequently, the speed of the overall process of stacking the boards is limited to the maximum pace of the arms or forks. This pace can be improved by providing multiple sets of arms or forks operating in an alternating manner, but such a set up also increases the number of mechanical components involved, and the overall complexity, space, and cost of the apparatus. As mentioned above, the maximum pace that can be reached by such apparatuses usually cannot cope with the pace of the other operations on the lumber mills chain of operations, all of which resulting in a bottleneck at this stage. Moreover, this process is power consuming as the mechanism constantly has to fight inertia in the course of its movements.

Hence, in light of the aforementioned, there is a need for an improved board stacking apparatus which, by virtue of its design and components, would be able to overcome or at least minimize some of the above-discussed prior art concerns.

SUMMARY OF THE INVENTION

According to a first general aspect, there is provided a board stacking apparatus for stacking a plurality of board layers into a stack supported by a stack holder. The stack has front and back edges, and each of the board layers is formed of a finite number of boards dispensed in a side-by-side configuration by a board dispensing mechanism adjacent to the front edge of the stack.

The board stacking apparatus includes a movable support having at least two arms sized to span a length of the stack between the rear and front edges thereof, the at least two arms having a receiving end; a rear stopper extending vertically in line with the rear edge of the stack; and a power assembly operatively connected to the movable support to move the same according to a layer stacking routine for stacking a corresponding one of the board layers onto the stack holder, the layer stacking routine includes:

a) positioning the movable support at a receiving position wherein the at least two arms extend across and immediately above the stack and the receiving end thereof extend proximate and evenly levelled with the board dispensing mechanism;

b) maintaining the movable support in the receiving position while the board dispensing mechanism dispenses the boards of the corresponding one of the board layers thereon, until a first dispensed board of the board layer engages the rear stopper; and c) moving the movable support in a rearward direction to slide the same from under the board layer, thereby dropping the board layer onto the stack.

The board stacking apparatus further includes an abutment component associated with each of the at least two arms of the movable support, each abutment component being located proximate to and slightly below the board dispensing mechanism, each abutment component being configured to support the receiving end of the corresponding one of said arms when the same is in the receiving position, and further configured to release said receiving end when the movable support is moved in the rearward direction.

In an embodiment, the stacking routine of the board stacking apparatus comprise additional steps. In this embodiment, following step c) of the above-mentioned layer stacking routine, additional steps are executed. These steps include: i) pivoting the movable support upwardly; ii) moving the movable support in a forward direction, above the stack; and iii) pivoting the movable support downwardly, to position the same in the receiving position.

In an embodiment, the movable support is composed of a set of at least two bars forming the arms where each bar is operatively connected to a slide rail. The set of bars repeatedly moves forward and backward on the slide rails to execute the basic steps of the layer staking routine (steps a) to c)).

In an embodiment, the slide rails are pivotable to allow the bars to pivot upward and downward in order to execute the additional steps (steps i) to iii)) of the stacking routine. In this embodiment, the slide rails are repeatedly pivoted upward and downward and the set of arms are repeatedly moved forward and backward on the slide rails to execute the layer stacking routine.

In another embodiment, the movable support is composed of a set of at least two housings, where each housing has an extendible rod therein forming one of the arms and an actuator repeatedly extending the rods from the housings and retracting the rods into the housings. In this embodiment, the extendible rods are repeatedly extended from the housings and retracted into the housings in order to execute the basic steps of the staking routine (steps a) to c)).

In an embodiment, the housings are pivotable. In this embodiment, the housings are repeatedly pivoted upward and downward and the extendible rods are repeatedly extended from the housings and retracted into the housings in order to execute the steps of the layer stacking routine.

In another embodiment the movable support is a fork that is being moved forward and backward in order to execute the layer stacking routine.

According to another aspect of the invention, there is provided a board stacking apparatus for stacking a plurality of board layers into a stack supported by a stack holder, the stack having a front edge and a back edge, each of the board layers being formed of a finite number of boards dispensed in a side-by-side configuration by a board dispensing mechanism adjacent the front edge of the stack.

The board stacking apparatus includes a pair of movable supports each having at least two arms sized to span a length of the stack between the rear and front edges thereof, the at least two arms of each movable support having a receiving end; a rear stopper extending vertically in line with the rear edge of the stack; and a power assembly operatively connected to the pair of movable supports to move the movable supports according to a layer stacking routine for stacking a corresponding one of the board layers onto the stack holder.

The layer stacking routine includes:
a) positioning one of the movable supports at a receiving position wherein the at least two arms thereof extend across and immediately above the stack and the receiving end thereof extend proximate and evenly levelled with the board dispensing mechanism;
b) positioning the other one of the movable supports at an upper position wherein the at least two arms thereof extend over the one of the movable supports in a spaced apart relationship;
c) maintaining the movable supports in the receiving and upper positions while the board dispensing mechanism dispenses the boards of the corresponding one of the board layers therebetween until a first dispensed board of the board layer engages the rear stopper; and
d) moving the one of the movable supports at the receiving position in a rearward direction to slide the same from under the board layer, thereby dropping the board layer onto the stack.

The board stacking apparatus further includes an abutment component associated with each of the at least two arms of the movable supports, each abutment component being located proximate to and slightly below the board dispensing mechanism, each abutment component being configured to support the receiving end of the corresponding one of said arms when the same is in the receiving position, and further configured to release said receiving end when the corresponding movable support is moved in the rearward direction.

The power assembly positions the movable supports of the pair of movable supports in the receiving and top positions in an alternating manner for the stacking of successive ones of the board layers.

In an embodiment, the pair of movable support is composed of two sets of at least two bars forming the arms, where each bar of each sets of bars is operatively connected to a pivotable slide rail. The slide rails of each set of bars are repeatedly pivoted upward and downward and the set of bars repeatedly move forward and backward on the slide rails to execute the layer stacking routine.

In another embodiment the pair of movable supports is composed of two sets of at least two pivotal housings having extendible rods, where each housing has an extendible rod therein forming one of the arms and an actuator repeatedly extending the rods from the housings and retracting the rods into the housings. The pivotal housings are repeatedly pivoted upward and downward, and the extendible rods are repeatedly extended from the housings and retracted into the housings, in order to execute the layer stacking routine.

In an embodiment, a first subset comprising at least two arms of one of the movable support forms the first active arms subset, a second subset comprising at least one arm of the same forms the first inactive arms subset, a third subset comprising at least two arms of the other one of the movable support forms the second active arms subset, and a fourth subset comprising at least one arm of the same forms the second inactive arms subset. In this embodiment, the at least two arms of the first and second active arms subsets execute the stacking routine, while the at least one arm of the first and second inactive arms subsets remain motionless in a position away from the stack.

In an embodiment, the pair of movable supports is composed of two forks being repeatedly moved up, forward, down and backward in an alternating manner in order to execute the layer stacking routine.

Advantageously, board stacking apparatuses according to embodiments of the present invention allow an increase in the stacking speed of board layers, as it requires a minimal displacement of the movable support or supports, which also contributes to a reduction in the power required for such a task. Also advantageously, the board stacking apparatus is preferably compact and can therefore be installed in more confined spaces than traditional board stacking apparatuses. Given the fact that lumber mills are usually crammed places where the use of space needs to be maximized, compactness is often desirable. Furthermore, stacking apparatuses according to embodiments of the invention may be designed so that none of its components interferes with the stick placing apparatus, which, when provided, is usually located above the stack holder. Both apparatuses can therefore be easily combined.

Other features and advantages of the present invention will be better understood upon a reading of preferred embodiments thereof with reference to the appended drawings.

BRIEF DESCRIPTION OF THE DRAWINGS

For a better understanding of the invention and to show how the same may be carried into effect, reference is now made by way of example to the accompanying drawings in which.

DETAILED DESCRIPTION OF THE INVENTION

Figure 1:
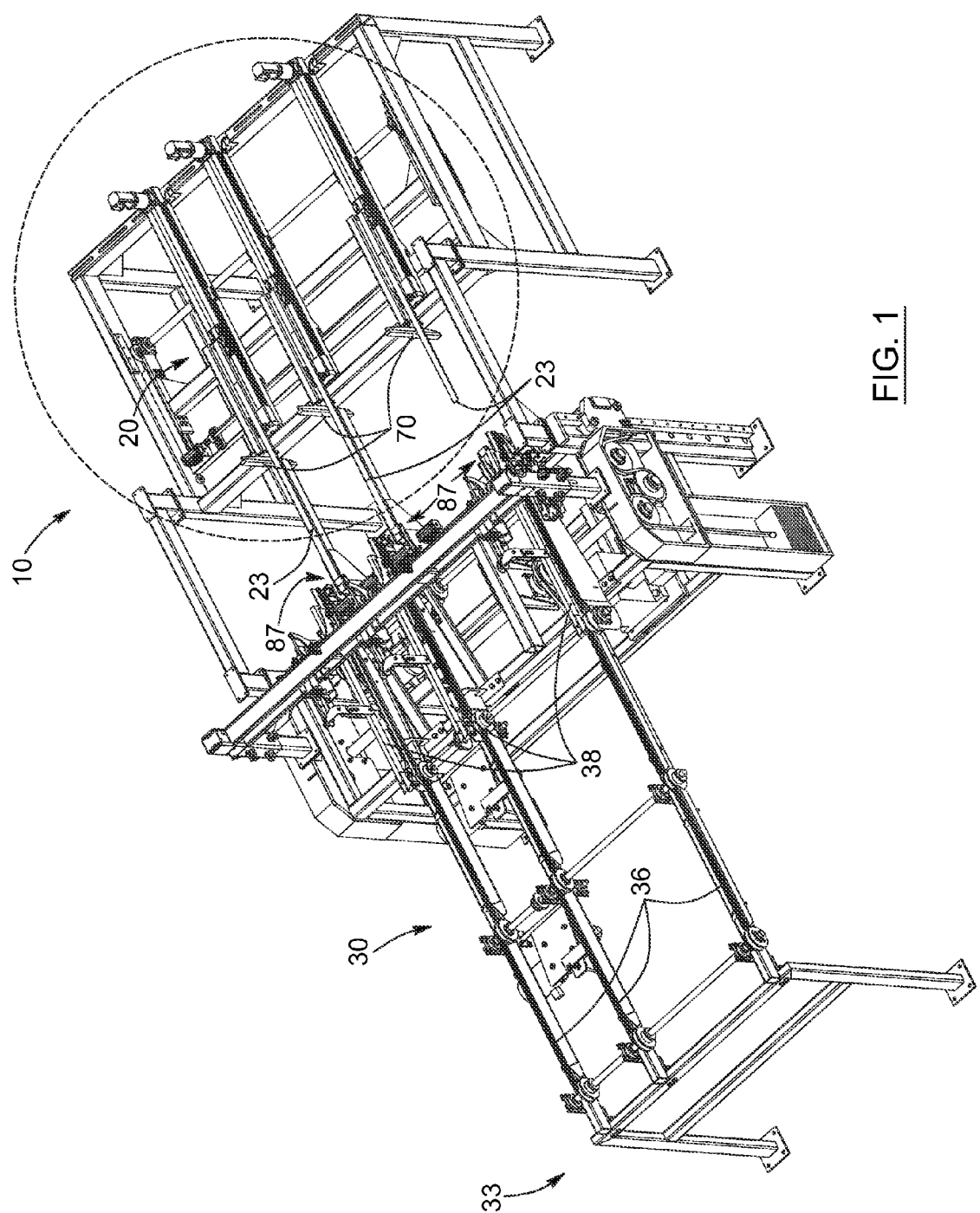
FIG. 1 is a perspective view of a board stacking apparatus according to an embodiment of the invention.

In the following description, the same numerical references refer to similar elements. The embodiments, geometrical configurations, materials mentioned and/or dimensions shown in the figures or described in the present description are preferred embodiments only, given solely for exemplification purposes.

Moreover, although the preferred embodiment of the board stacking apparatus and corresponding parts thereof consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation thereinbetween, as well as other suitable geometrical configurations, may be used for the board stacking apparatus according to the present invention, as will be briefly explained herein and as can be easily inferred herefrom by a person skilled in the art, without departing from the scope of the present invention.

Referring generally to FIGS. 1 and 3a to 3f, in accordance with one embodiment of the present invention, there is provided a board stacking apparatus 10 for stacking a plurality of board layers 12 into a stack 14. As will be easily understood by one skilled in the art, a board layer 12 is formed of a finite number of boards 11 horizontally abutted side by side. The number of boards in a given layer 12 is usually determined by the width of the boards forming the layer 12 and the desired width of the resulting stack 14.

In the context of the present invention a board is understood to refer to any type of lumber to be stacked, such as, without being limitative, flitches, planks, joist, beams, panels or the like.

As previously mentioned, a stack is formed of a plurality of board layers laying on top of each other. For example, stacks may be typically formed of approximately between 10 and 50 layers, typically resulting in a total height of 32 inches, but one skilled in the art will readily understand that the board stacking apparatus of the present invention is not limited in the number of layers that can be stacked and could be used for stacks responding to different needs of the industry. The layers of the stacks formed using the board stacking apparatus can be spaced apart by sticks or simply lay directly on one another. When sticks are used, they can be used to separate each layers of the stack or groups of layers. The stack has a front edge 13 and a back edge 15, the front edge being the edge closer to the board dispensing mechanism 30, which will be defined hereafter, while the back edge 15 is the edge of the stack opposite to the front edge 13.

In operation, the boards to be stacked are dispensed to the board stacking apparatus in a side-by-side configuration from a dispensing mechanism adjacent the front edge of the stack. The dispensing mechanism 30 is any mechanism that may carry a plurality of boards in a predetermined direction towards the board stacking apparatus. The forming stack is supported by a stack holder, which may also be embodied by any appropriate device.

Now referring to FIG. 1, in one embodiment the dispensing mechanism 30 may include a bottom motion member 36 and a top motion member 38. The bottom motion member 36 preferably supports the boards and induces movement for the boards to be carried forward, while the top motion member 38 either puts pressure on the boards, from above, while inducing a forward movement, in order to help the progression of the boards, or simply act as a flat guide to prevent the boards from piling up. The bottom motion member 36 can be embodied using various types of conveyors, such as, but not limited to transfer chains or conveyor belts. The bottom motion member 36 has an entry end 33 and an exit end 34, the exit end 34 being adjacent the front edge 13 of the stack 14 in operation and spans across a finite length therebetween. The top motion member 38 preferably extends only over a portion of the length of the bottom motion member, for example proximate to the exit end 34 of the dispensing mechanism 30.

When the top motion member 38 is used to induce movement of the boards, it can be either a rubber wheel (as shown on FIGS. 5a, 5b and 6), a conveyor belt having an anti-skid surface, or any other mechanism capable of doing the same. In these cases, the top motion member 38 can be embodied by any mechanism offering sufficient grip to push the board layer 12 forward onto the movable support(s) 20. Typically, rubber wheels work well with larger boards, while a conveyor belt is better when dispensing narrower boards, as it distributes the pressure over a larger amount of boards and is therefore less likely to cause the exiting boards to pile up. When the top motion member 38 is used only as a flat guide to prevent the occurrence of pile-up, the top motion member is usually a hold-down shoe (as shown on FIG. 1). The hold-down shoe can be understood to be a device having a flat bottom surface extending proximal to the top of the boards being dispensed. As previously mentioned, the hold-down shoe prevents piling up of the boards, by preventing upward movement of the boards when they are pushed against one another. Consequently, the position of a hold down shoe relative to the bottom motion member 36 is preferably adapted according to the thickness of the boards being dispensed.

In an embodiment, the top motion member could also be a combination of the possible embodiments presented herewith, and can therefore for example, and without being limitative, be used as a flat guide in a first section and to induce movement in a second section.

In one embodiment, a flat bottom guide (not shown) may be provided at the exit end 34 of the dispensing mechanism 30. The function of the flat bottom guide is to help the transition of the boards between the dispensing mechanism 30 and the board stacking apparatus 10, and to maintain the straight horizontal movement of the boards despite the usually rounded edges of the dispensing mechanism 30.

It will be readily understood that, in alternative embodiments, the board stacking apparatus may be used in combination with a dispensing mechanism differing from the variants described above.

Figure 3A:
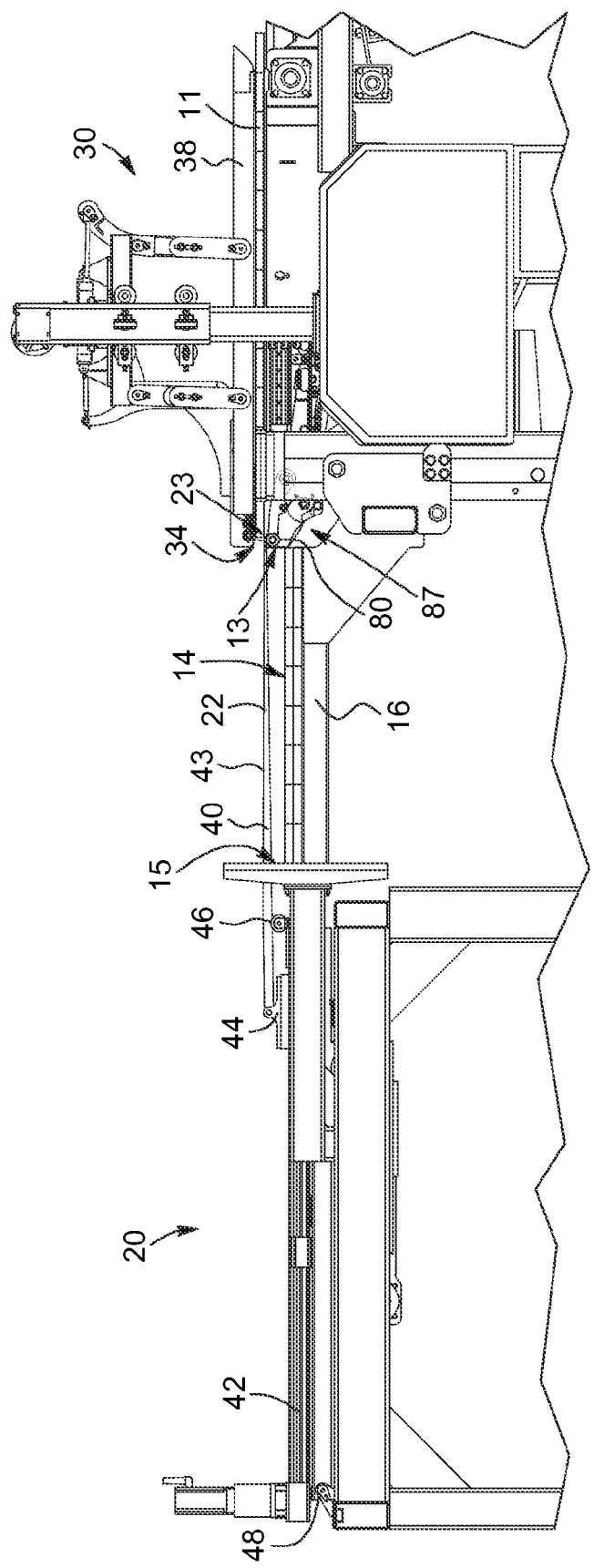
FIG. 3a is a side view of a board stacking apparatus according to an embodiment, wherein the movable support is shown in a receiving position.
Figure 3B:
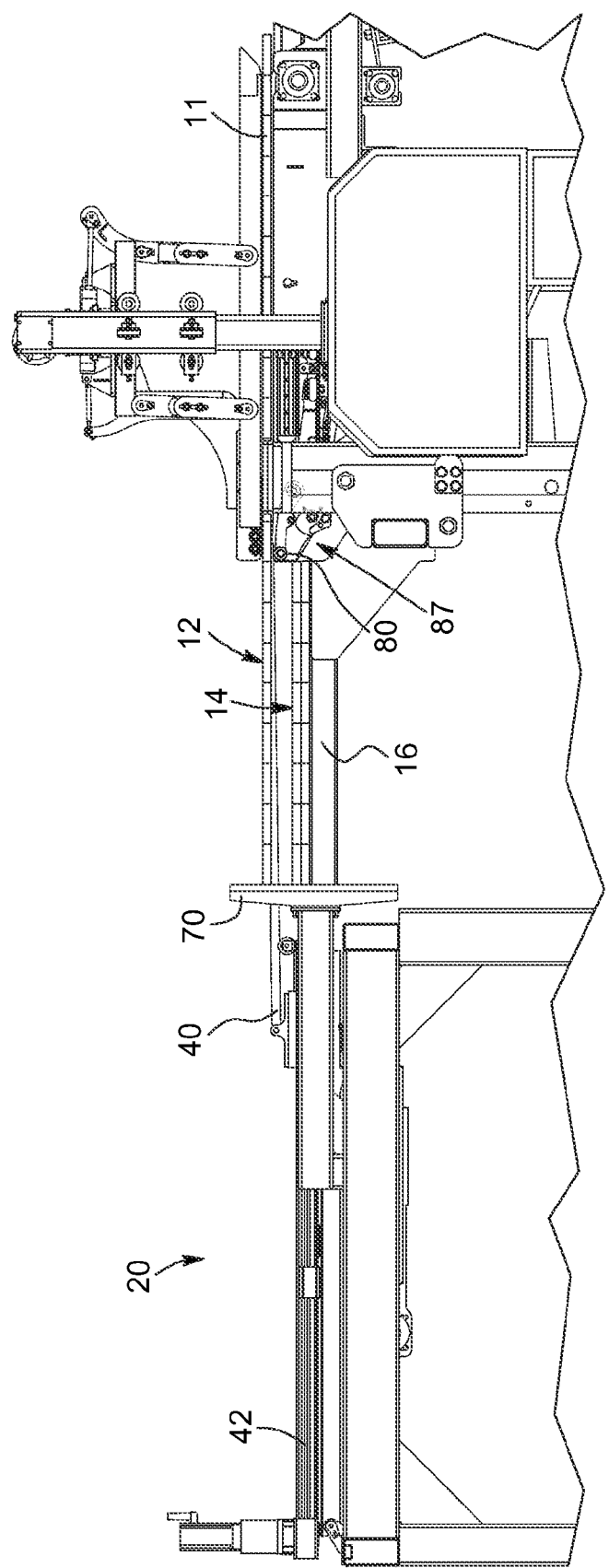
FIG. 3b is a side view of the board stacking apparatus of FIG. 3a, wherein the movable support is shown in a receiving position and a board layer is being dispensed thereon.

Now referring to FIGS. 3a and 3b, the stack holder 16 can be defined as a planar support on which lays the forming stack 14. Preferably, during the formation of the stack, the stack holder 16 is moved vertically downward of a distance corresponding to the height of the board layer 12, every time a new layer 12 is added to the stack. Thus, the vertical level of the top layer of the stack remains constant during the formation of the stack. The stack holder 16 can be any lift or equivalent device commonly used in the industry.

Board stacking apparatuses according to embodiments of the present invention will now be described in more details.

Referring to FIGS. 1, 2, 3b and 3c, in the illustrated embodiment the board stacking apparatus has one or two movable support(s) 20 for receiving the board layer 12 from the dispensing mechanism 30 and depositing it on the forming stack (a single movable support is shown in FIG. 1). Each movable support 20 includes a set of at least two arms 22, which can be defined as supporting members having a flat upper surface 43. The number of arms 22 can vary according to the type of wood of the boards to be stacked (hardwood allowing greater width between each supporting arm 22 than softwood) and to the length of the boards to be stacked (the longer the boards, the more supporting arms are needed). The length of each supporting arm 22 is at least sufficient to cover the width of the stack 14, spanning the length of the stack between the rear 15 and front 13 edges, but can also be longer than the above-referenced width. The height or diameter of each arm 22 should also be sufficient to offer the required strength to support the weight of a board layer 12 thereon, at least temporarily. The height or diameter preferably decreases towards the receiving ends 23 of each arm 22, resulting in a tapered shape, which may help to release the boards smoothly onto the stack. The movable support(s) 20 can be embodied using different solutions as can be seen from the different embodiments presented below As can be better seen in FIGS. 1, 3a to 3f, 7 and 8, in an embodiment, abutment components 87 are provided proximate to the exit end 34 of the bottom motion member 36 of the dispensing mechanism 30 and slightly below the level of the bottom motion member 36. One skilled in the art will understand that the terms "proximate to the exit end" and "slightly below the level of the bottom motion member" are used herein to indicate a general positioning of the abutment components 87 and should not be interpreted in a restrictive sense. For example and without being limitative, a section of the abutment components 87 may extend further from the described position as long as the abutment component can fulfill the supporting function described below.

Each abutment component 87 has at least a portion sized and shaped for receiving and supporting the receiving ends 23 of a corresponding arm 22. When the bottom of the receiving end 23 of a corresponding arm 22 abuts onto the abutment component 87, the upper surface 43 of the arm 22 is evenly levelled with the bottom motion member 36 of the dispensing mechanism 30. It should be understood that in the course of the present document, the term "evenly levelled" should not be understood in a restrictive manner and need not refer to a perfect alignment between the dispensing mechanism 30 and the arms 22. Therefore, one skilled in the art would understand that the arms 22 could have a slight downward or upward inclination and/or be slightly below the level of the bottom motion member 36 of the dispensing mechanism 30. In an embodiment, the upper surface 43 of each arm 22 of the movable support 20 is approximately ⅛ inch below the level of the bottom motion member 36 of the dispensing mechanism 30 when the arms 22 abut the abutment component 87 and are maintained in the receiving position, which will be described below.

Figure 7:
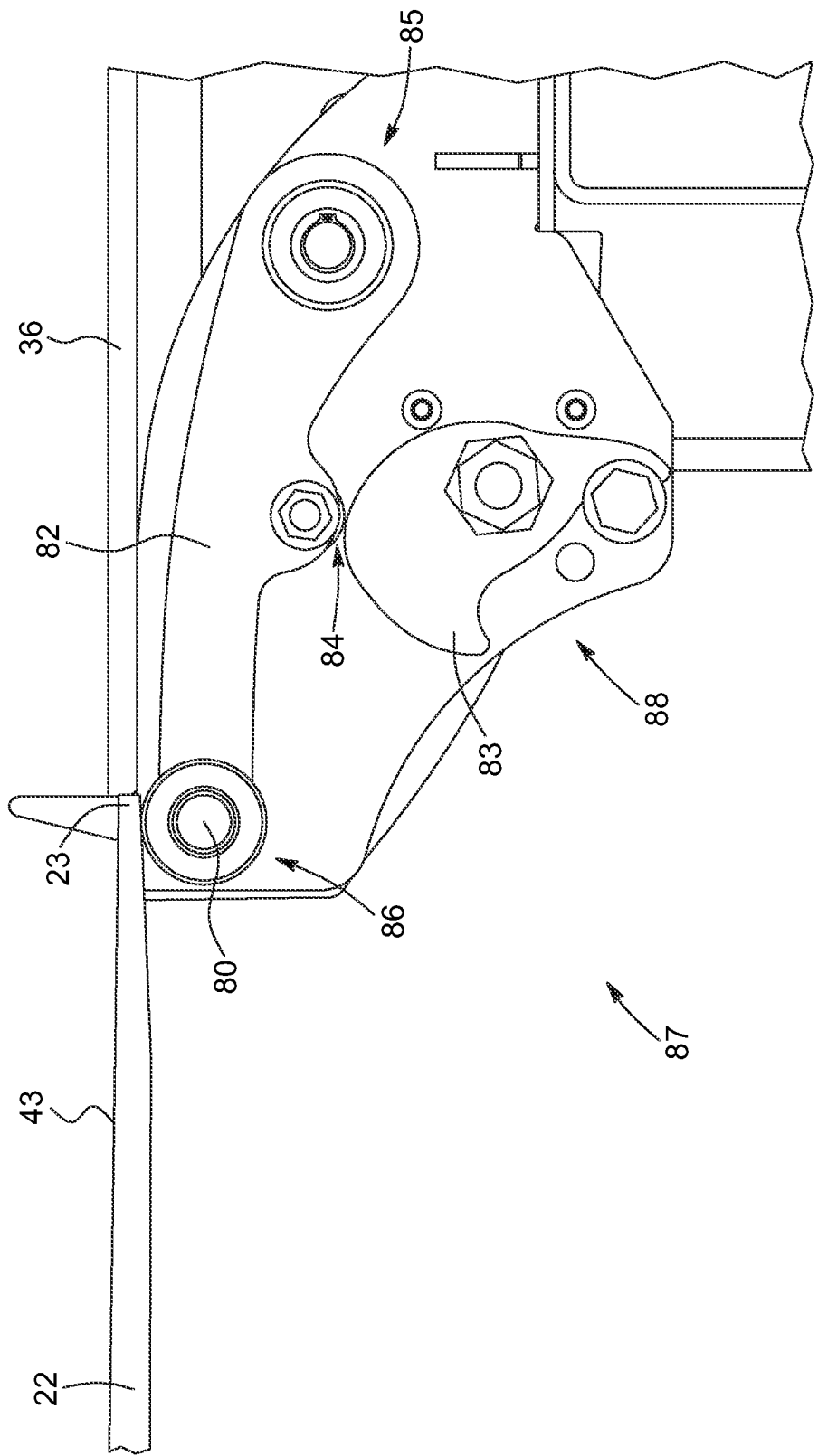
FIG. 7 is a close-up side view of a section of a board stacking apparatus according to an embodiment, wherein an abutment member is shown in combination with a movable support in the receiving position, the abutment member being shown in an upper configuration.
Figure 8:
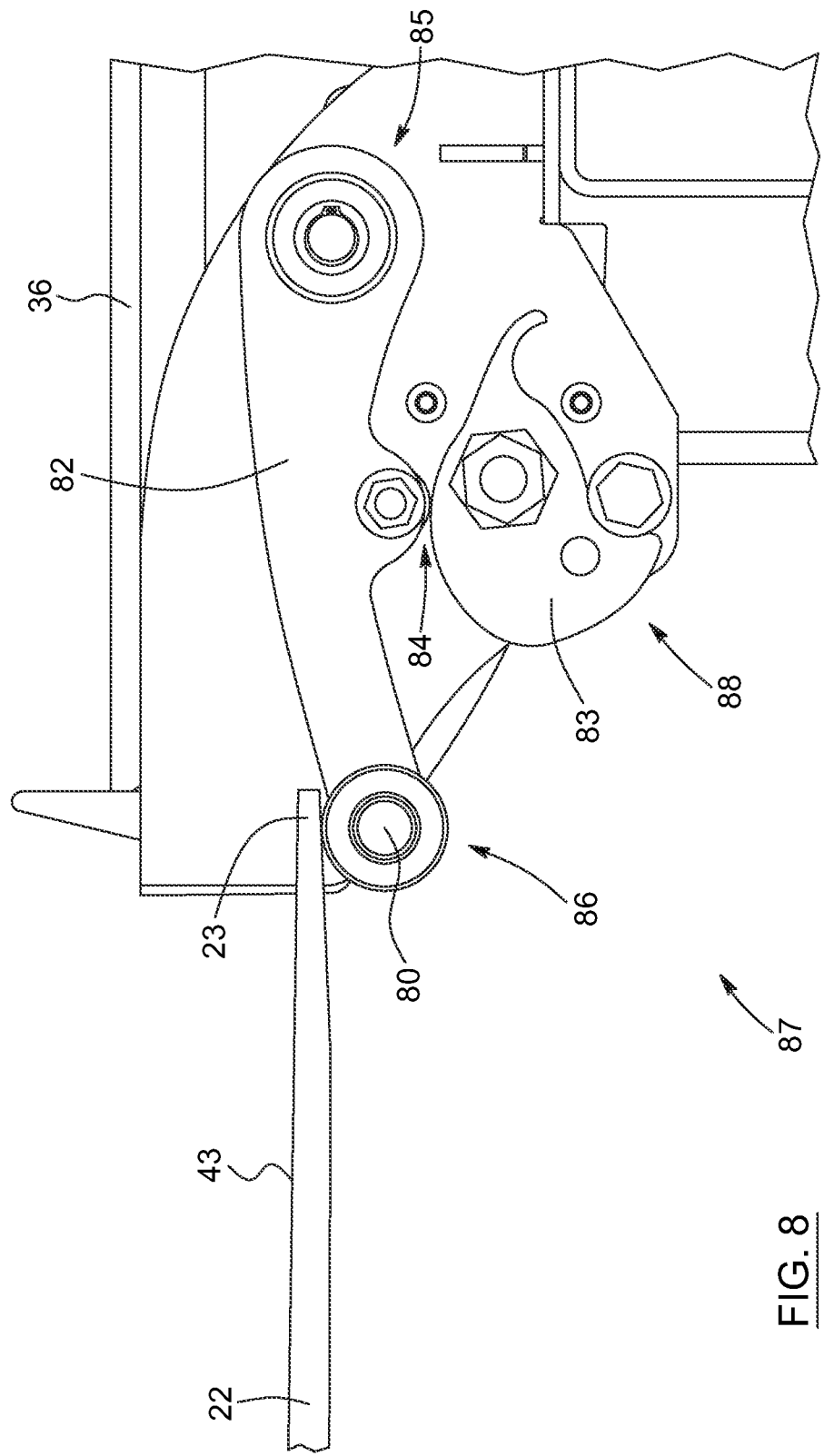
FIG. 8 is a close-up side view of the section of a board stacking apparatus shown in FIG. 7, wherein the abutment member is shown in a lower configuration.

Referring to FIGS. 7 and 8, in an embodiment each abutment component 87 includes an elongated support member 82 with a roller 80 mounted thereto for supporting the receiving end 23 of a corresponding arm 22. In the illustrated embodiment, the support member 82 is movable between an upper configuration (as shown in FIG. 7) and a lower configuration (as shown in FIG. 8). In the illustrated embodiment, the support member 82 has an elongated shape with a pivotally mounted pivot end 85 and an opposite engagement end 86 where the roller 80 is mounted to the support member 82.

An actuation mechanism 88 is operative to move the support member 82 between the upper configuration and the lower configuration. In the illustrated embodiment, the actuation mechanism 88 includes a cam assembly 83 which abuts the support member 82 for pivoting the support member 82 between the upper configuration and the lower configuration. The cam assembly 83 is an eccentric component positioned below the support member 82 to abut a supporting section 84 between the pivot end 85 and the engagement end 86 of the support member 82. Since the support member 82 is pivotally mounted at the pivot end 85, a rotation of the cam assembly 83 results in pivoting of the support member 82 about the pivot end 85, as the support provided at the support point 84 by the cam assembly 83 is varied. The pivoting of the support member 82 about the pivot end 85 causes a variation of the vertical position of the roller 80 located at the engagement end 86.

One skilled in the art will understand that the abutment components 87 may be embodied by other types of assemblies or mechanisms, different than the one described above in reference to FIGS. 7 and 8. As will be readily understood, this implies that different types of support member 82, which may be moved differently than by pivoting, may also be used. For example and without being limitative, in an alternative embodiment, the abutment components 87 may include a cylinder movable vertically. In another alternative embodiment, the abutment components 87 may be a fixed inclined member onto which the receiving ends 23 of arm are received. According to still another alternative embodiment, the abutment components 87 may include a fixed member having a non-inclined upper surface engaging the receiving end 23 of the arm 22. In such an embodiment, the stack holder 16 may move such that the stack engages the arms of the movable support when the receiving end 23 of the arm 22 is released from the abutment member 87 as the movable support is moved in the rearward direction.

In an embodiment, the actuation mechanism 88 of each one of the abutment components 82 is controlled by an actuator (not shown). The actuator can be synchronized with the actuator driving the movable support(s) such that an adequate timing occurs between the movement of the movable support (s) and that of the abutment members. For example and without being limitative, the cam assembly 83 may be electrically connected to the power assembly.

Referring to FIGS. 1, 2, 3b and 3c, the board stacking apparatus is further provided with a rear stopper 70 for preventing the horizontal movement of the first dispensed board of a board layer 12 beyond a certain limit coinciding with the rear edge 15 of the stack 14. The rear stopper 70 may be any blocking member or structure extending vertically in line with the rear edge of the stack such as, but without being limitative, a fixed metal block or plate. The rear stopper 70 is used during the dispensing of the boards onto the arms 22 of the movable support(s) 20, in order to prevent the first dispensed board of the new board layer 12 from traveling further than the rear edge 15 of the stack 14.

The board stacking apparatus also has a power assembly which is operatively connected to each movable support 20 and moves the movable support 20 according to a stacking routine, as detailed below. The power assembly can be embodied by several different power systems, the selection of the system being dependent on the type of movable support used, but can generally be defined as a mechanical assembly providing the necessary power to repeatedly displace each movable support according to a predetermined routine.

Exemplary Embodiments of Movable Supports
Single Set of Bars Mounted on Slide Rails In the embodiment shown on FIGS. 1, 2 and 3a to 3f, the movable support 20 is embodied by a single set of at least two bars 40, forming the arms 22, and mounted on slide rails 42 and repeatedly moving forward and backward thereon to execute the layer stacking routine. In the illustrated embodiment, and without being limitative, three bars 40', 40" and 40''' each mounted on a respective slide rail 42', 42" and 42''' are shown, however one skilled in the art will easily understand that the number of bars could differ. In the illustrated embodiment, each bar comprises a bar base 44 connecting the bar 40 to the corresponding slide rail 42 and power assembly, thereby allowing forward and rearward movement of the bars 40. A supporting roller 46 is preferably provided underneath each bar 40, on a section of the slide rail 42 proximate to the stack 14. The supporting roller 46 provides an additional supporting point in order to distribute the load of the bar 40 (especially when loaded with a board layer 12) between the bar base 44 and the supporting roller 46.

In this embodiment, the power assembly of the movable support 20 is provided by a set of synchronized electric cylinders (not shown) located within the slide rails 42. The number of electric cylinders preferably corresponds to the number of arms of the movable support 20, since a corresponding electric cylinder is located within each of the slide rail 42 of the movable support 20. The bar base 44 of each bar 40 is connected to the electric cylinder located within each corresponding slide rail 42. Therefore, the linear movement of the electric cylinder induces linear movement of the bar base 44, and result in the bar 40, moving forward and rearward on the slide rail. The synchronization of the electric cylinders allows the cylinder to move at the same time and the bars 40 to act as a single support. One skilled in the art will however understand that other type of actuator could be used as the power assembly such as, without being limitative, pneumatic cylinders, hydraulic cylinders, or the like.

It will be understood that in the context of the present description the forward direction is directed towards the dispensing mechanism while reference to a rearward direction is understood as moving away from the dispensing mechanism. In order to stack each new layer 12 onto the stack 14, the bars 40 are moved by the power assembly according to a specific stacking routine for stacking a board layer onto the stack holder. The stacking routine includes at least three successive base steps which are repeated a predetermined number of times in the formation of each stack, in accordance with the number of board layers in the stack.

The first step is the positioning step, shown on FIG. 3a, where the movable support 20 is positioned at a receiving position. The receiving position is the position where the bars 40 extend across and immediately above the forming stack 14. In this step, the receiving ends 23 of the bars 40 of the movable support 20 are located proximate to the edge of the exit end 34 of the dispensing mechanism 30.

In a preferred embodiment, the bars 40 of the movable support 20 are evenly levelled with the dispensing mechanism 30 in order to allow the transfer of the boards from the dispensing mechanism 30 to the movable support 20. As previously mentioned, one skilled in the art will understand that in this context, the expression "evenly levelled" need not refer to a perfect alignment between the dispensing mechanism and the arms 22 of the movable support 20, and that the arms could have a slight downward or upward inclination and/or be slightly below the level of the dispensing mechanism 30.

The second step is the dispensing step. During this step shown on FIG. 3b, the movable support 20 is maintained in the receiving position while the boards are dispensed, from the dispensing mechanism 30, onto the bars 40. This step terminates when the new layer 12 has been entirely dispensed onto the movable support 20. Usually this concurs with the abutment or engagement of the first dispensed board of the board layer 12 with the rear stopper 70.

The third step is the dropping step. In this step, the movable support is moved in a rearward direction, typically until the bars 40 reach the rearward position shown on FIG. 3c. During the rearward movement, the bars 40 slides from under the dispensed board layer 12, which layer consequently drops onto the forming stack 14. During the dropping step, rearward horizontal movement of the layer 12 to be deposited on the stack 14 is prevented by the rear stopper 70, which allows the new layer 12 to be maintained vertically in line with the stack 14.

As previously mentioned, once the third step is completed, another cycle of the stacking routine can usually start with the repositioning of the bars 40 in the receiving position. However, in an embodiment, the stacking routine may include three additional steps where the slide rails 42 are pivoted upward and downward to allow a greater stacking rate. The three additional steps where the slide rails 42 are additionally pivoted upward and downward also allow the receiving end 23 of each slide rail 42 to be lowered onto a corresponding abutment component 87 and be supported by it, when positioned in the receiving position, such that the receiving end 23 of each slide rail 42 is properly positioned even in the case where a slide rail 42 becomes crooked.

Figure 2:
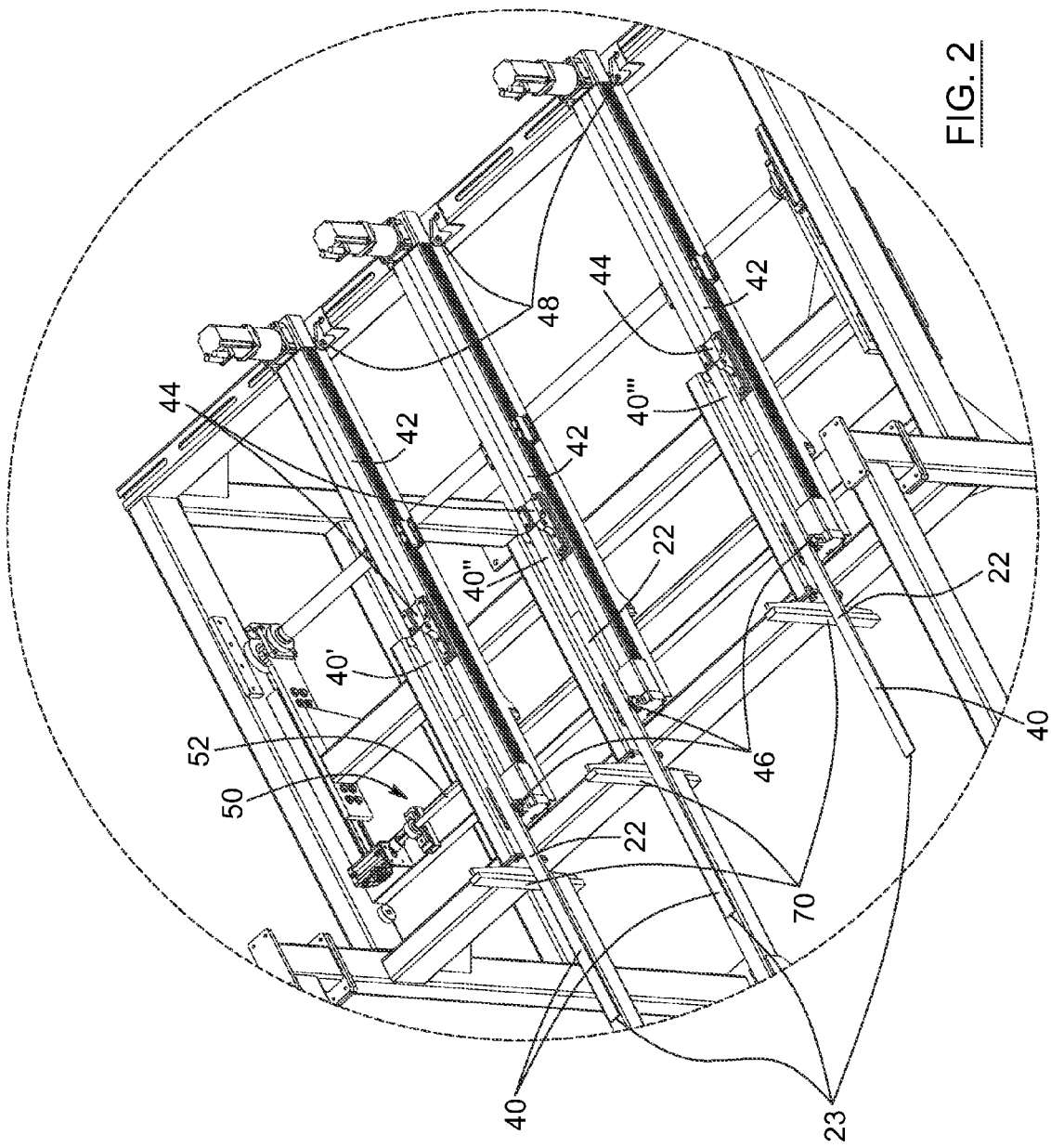
FIG. 2 is an enlarged perspective view of the stacking apparatus of FIG. 1, showing a single movable support.

In this embodiment, and as better shown on FIG. 2, the slide rails 42 are pivotally mounted on the apparatus 10 by a pivot 48 at the extremity located opposite to the stack 14. A moving mechanism 50 having a rotational shaft 52 operationally connected to a set of cam (not shown) is also provided, wherein one cam is provided for each slide rail 42. When the rotational shaft 52 is rotated, a cam induces the slide rails 42 upward and downward, in order to provide upward and downward pivoting of the corresponding slide rail 42, thereby resulting in the upward and downward pivoting of the associated bars 40. The orientation of the cams on the rotational shaft 52 is such that upward and downward movement of the slide rails 42 is synchronized.

Figure 3C:
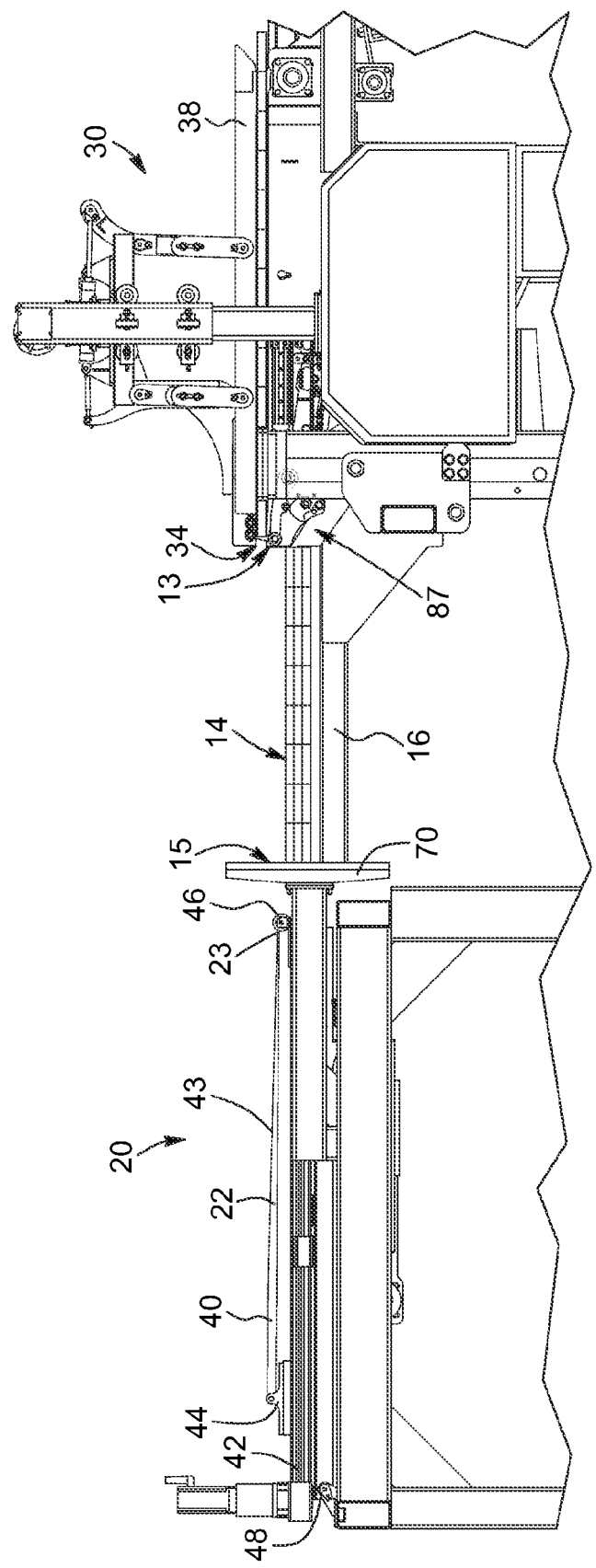
FIG. 3c is a side view of the board stacking apparatus of FIG. 3a, wherein the movable support is shown in a rearward position.
Figure 3D:
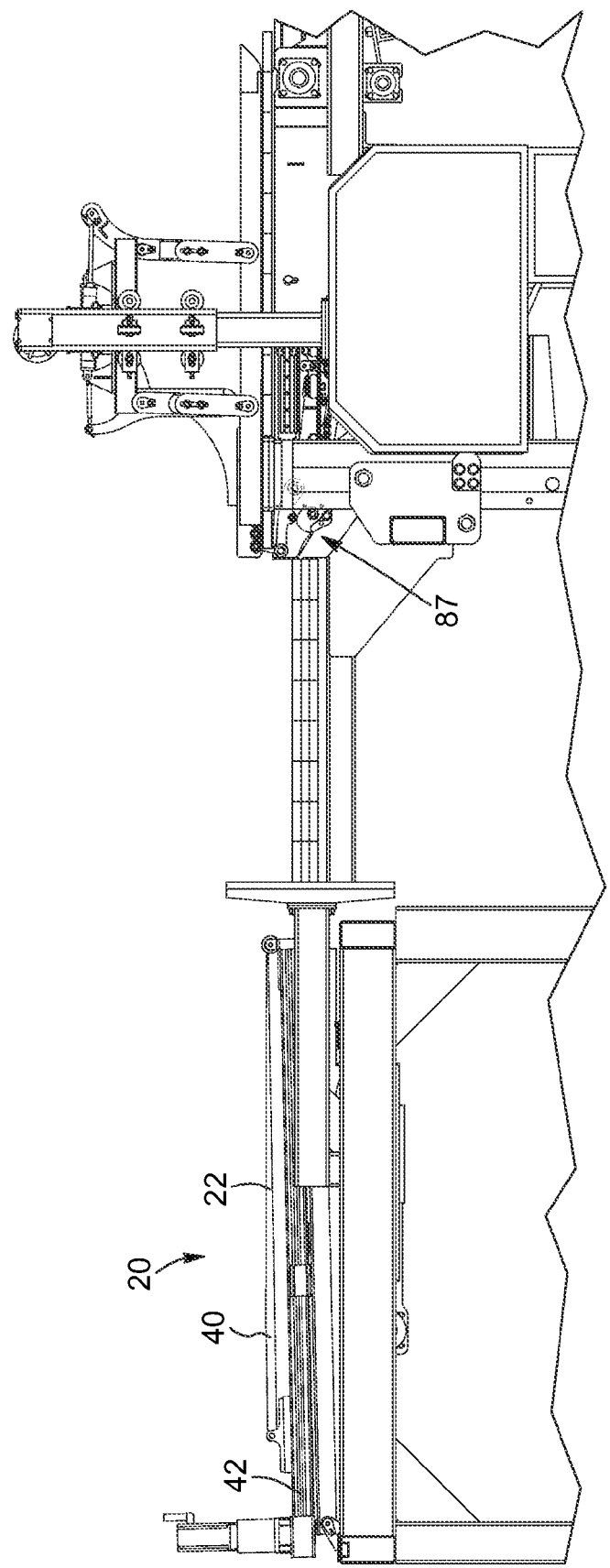
FIG. 3d is a side view of the board stacking apparatus of FIG. 3a, wherein the movable support is shown in a rearward upwardly pivoted position.

The first additional step is the upward pivoting step shown on FIG. 3d, where the slide rails 42, and therefore the entire movable support 20, are pivoted upwardly, typically of, without being limited to, an angle ranging between 5 degrees and 20 degrees.

Figure 3E:
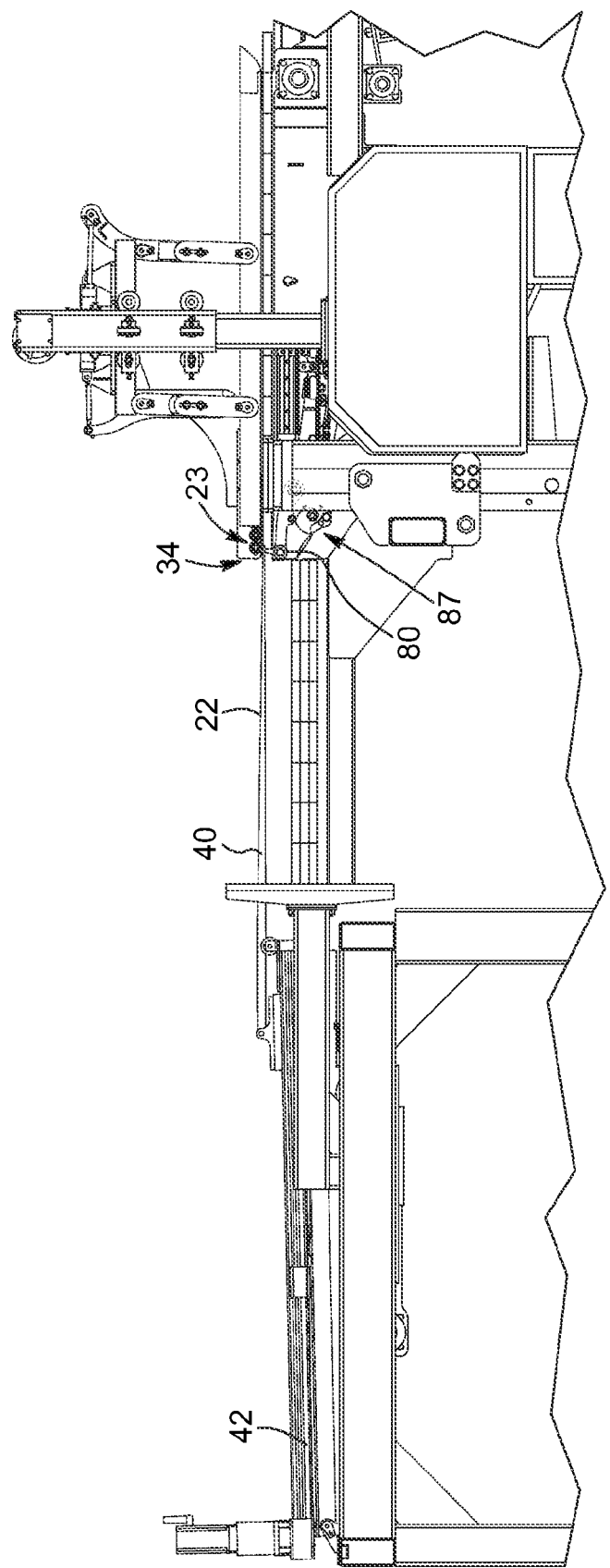
FIG. 3e is a side view of the board stacking apparatus of FIG. 3a, wherein the movable support is shown in a forward upwardly pivoted position.

The second additional step is the forward movement step, shown on FIG. 3e, where the bars 40 are moved forward above the stack 14. The bars 40 are moved forward until the tip 23 of each bar is approximately vertically in line with the edge of the exit end 34 of the dispensing mechanism 30. As the slide rails 42 have previously been pivoted upwardly, the bars 40 then extend at a distance over the top layer of the stack 14 as they advance above it.

The third additional step is the downward pivoting step, where the slide rails 42 are pivoted downwardly, thereby resulting in the bars 40 reaching the above-described receiving position and abutting the abutment components 87. In order to reach the receiving position, during the downward pivoting step, the slide rails are pivoted downward at least of an angle corresponding to the opposite of the angle given to them during the upward pivoting step.

In an embodiment, the bars 40 are not supported by any other support than the abutment components 87 when in the receiving position.

Figure 3F:
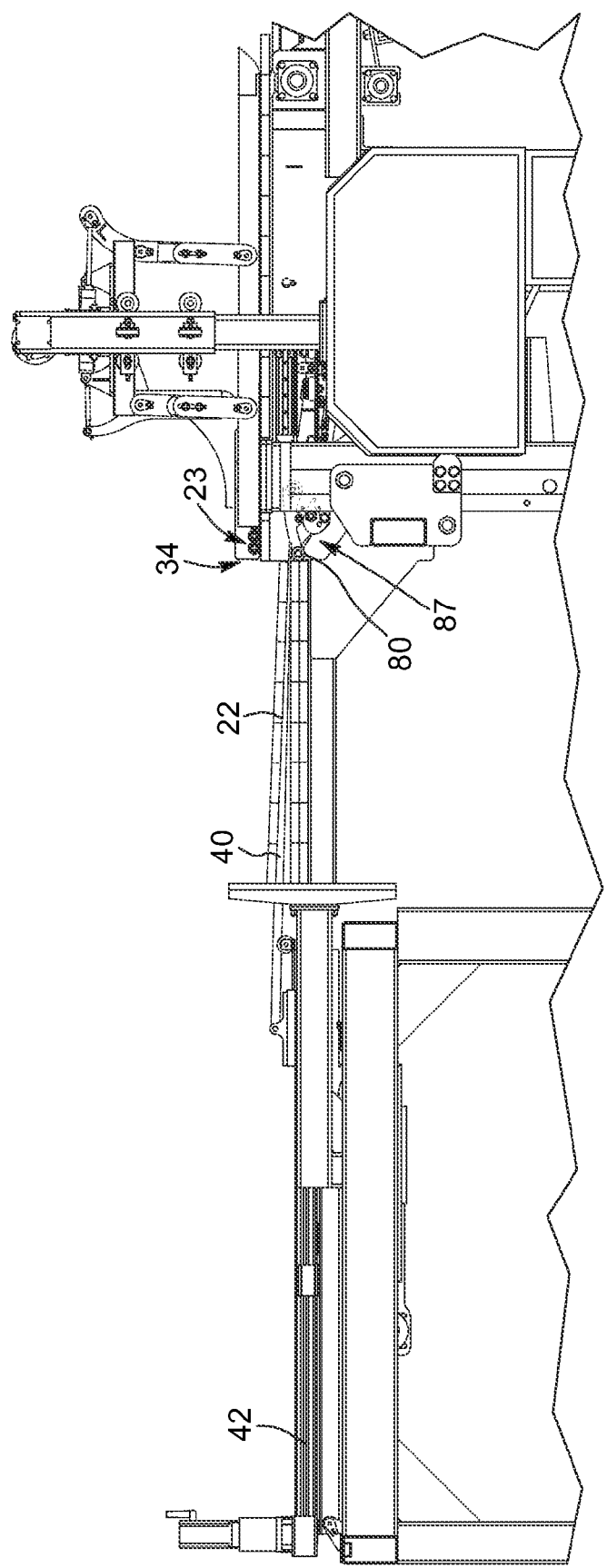
FIG. 3f is a side view of the board stacking apparatus of FIG. 3a, wherein the abutment member is shown in a lower configuration.

Referring to FIG. 3f, in an embodiment where the abutment components 87 has a support member 82 movable between the upper configuration and the lower configuration, an additional step may also be provided. In such an embodiment, the support members 82 of the abutment components 87 are configured in the upper configuration for engaging the receiving ends 23 of the bars 40 brought to the receiving position, in the above described third additional step. The abutment components 87 are maintained in the upper configuration during the dispensing step (shown in FIG. 3b). Subsequently, in a fourth additional step, and as shown in FIG. 3f, support members 82 of the abutment components 87 are moved in the lower configuration, and the bars 40 are thereby pivoted downwardly towards the stack. The additional fourth step allows a smooth dropping of the boards on the stack during the following dropping step, even in the case where a bar 40 has become crooked or the like.

It should be noted that the first and second additional steps, as well as the second and third additional steps do not need to be executed sequentially and could occur concurrently in order to increase the stacking rate. Moreover, one skilled in the art will understand that the upward and downward movement of the movable supports are not limited to pivoting movement, and that, in an embodiment, the movable supports 20 could be moved up and down, while remaining in a vertical configuration, with the same advantages as the one described below. Amongst other things, the three first additional steps allow the stacking rate of the apparatus to be increased, given that upwardly pivoted bars 40 can be moved forward simultaneously with the downward movement of the stack holder 16, without risking that the bars come into contact with the top layer of the stack. In contrast, if the three additional steps are not performed, the forward movements of the bars should occur subsequently to the downward movement of the stack holder 16, to prevent interference with the top layer of the stack.

Dual Sets of Bars Mounted on Slide Rails

For some applications, sufficient stacking rates can be achieved using the above-described single set of bars 40 on slide rails 42. However, in cases where greater stacking rate would need to be attained, a possible solution is the use of dual movable supports operating in an alternating manner.

Figure 2A:
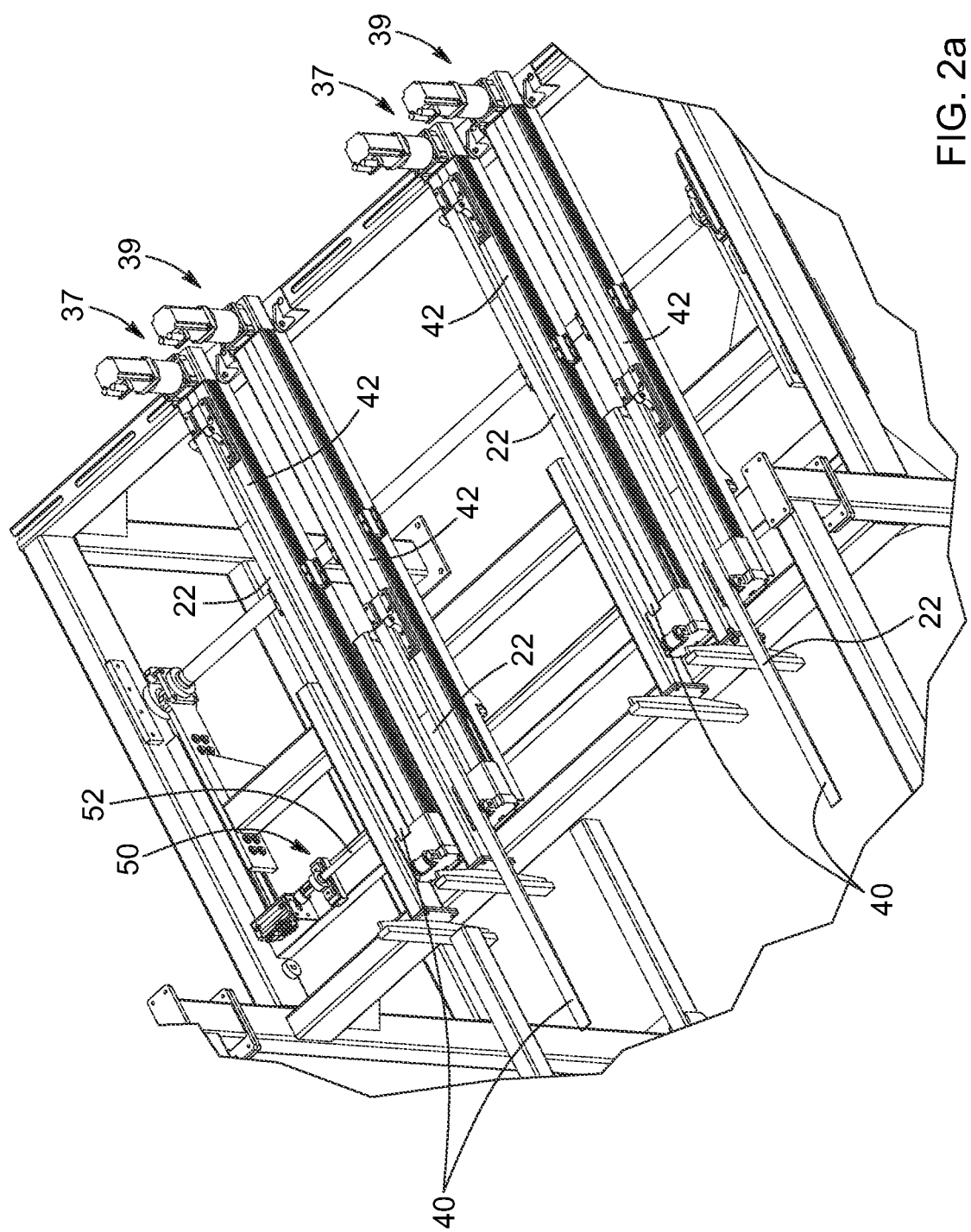
FIG. 2a is a close-up perspective view of a stacking apparatus according to an embodiment of the invention, showing two movable supports.

In an embodiment shown on FIG. 2a, the stacking apparatus therefore includes a pair of movable supports 20 each having a set of at least two arms 22, preferably embodied by two sets 37 and 39 of bars 40 mounted on corresponding slide rails 42. Each set 37 and 39 of bars 40 and slide rails 42 is similar to the pivotal set of bars 40 described above, where bars 40 are mounted on slide rails 42 having pivoting capabilities.

The available positions for the bars 40 and sliding rails 42 of each set 37 and 39 is similar to those described above, and illustrated on FIGS. 3a to 3f, where the sliding rails 42 are pivoted upward and downward and the bars 40 are moved forward and rearward.

Accordingly, in this embodiment the stacking routine of each set 37 and 39 of bars 40 and sliding rails 42 is similar to that of a single set, to the exception that the two sets 37 and 39 of bars 40 and sliding rails 42 operate alternatively such that when a first set 37 is in the receiving position (shown on FIG. 3a), the second set 39 of bars 40 is in the forward upwardly pivoted position (shown on FIG. 3e). Moreover, it is the second set 39 that is brought to the receiving position, after the rearward movement of the first set 37 (dropping step), the first set 37 being in turn subsequently set to the forward upwardly pivoted position.

In more details, when two movable supports 20, hereby embodied by the two sets 37 and 39 of bars 40 and sliding rails 42 are present, the stacking routine includes a first positioning step where one of the movable supports is positioned at a receiving position shown on FIG. 3a. In this position, the at least two bars 40 of a first set of bars 37 extend across and immediately above the stack and the receiving ends of the at least two bars 40 abuts the abutment component 87 provided proximate to the exit end of the dispensing mechanism 30. In this step, the bars 40 are evenly levelled with the dispensing mechanism 30 in order to allow the transfer of the boards from the dispensing mechanism 30 to the movable support 20. Once again, one skilled in the art will understand that in this context, the expression "evenly levelled" need not refer to a perfect alignment between the dispensing mechanism and the bars 40, and that the bars 40 could have a slight downward or upward inclination and/or be slightly below the level of the dispensing mechanism 30.

The stacking routine further includes an upward positioning step where the second movable support is set at an upper position, which is shown on FIG. 3e. In this position, the at least two bars 40 of the second set 39 of bars 40 extend over the bars 40 of the first set 37, in a spaced apart relationship.

The third step is the maintaining step wherein both movable supports are respectively maintained in the above described receiving and upper positions. During this step, the board dispensing mechanism 30 dispenses the boards of a board layers on the bars of the set which is in the receiving position. Therefore, the layer 12 is dispensed between the bars 40 of the first 37 and second 39 set, until a first dispensed board of the board layer 12 engages the rear stopper 70.

The fourth step is the dropping step where the movable support located at the receiving position is moved in a rearward direction until the rearward position shown on FIG. 3c is reached. In this step, the bars 40 of the first set 37 are therefore slid from under the board layer 12, which result in the dropping of the board layer 12 onto the stack 14. During this step, the bars 40 of the second set 39 preferably remain in the upper position.

In an embodiment where the support members 82 of the abutment components 87 are movable between the upper configuration and the lower configuration, an additional step may also be provided between the maintaining step and the dropping step. As previously mentioned, in such an embodiment, the support member 82 of the abutment components 87 are configured in the upper configuration for engaging the receiving ends 23 of the bars 40 in the receiving position. The support member 82 of the abutment components 87 are maintained in the upper configuration during the dispensing step and are subsequently moved in the lower configuration. Consequently the bars 40 are thereby pivoted downwardly towards the stack.

As previously mentioned, when a new stacking routine is performed, the first and second sets are subsequently inverted when the first and second positioning steps are performed. In the following cycle of the stacking routine, it is therefore the second set 39 of bars 40 and sliding rails 42 which is set at the receiving position, and the first set 37 of bars 40 and sliding rails which is brought to the upper position.

Even though, the steps are presented herein as sequential steps, one skilled in the art will understand that both sets 37 and 39 of bars 40 and sliding rails 42 may move in such a way that portions of the steps may occur concurrently, without departing from the scope of the present invention.

The power assembly for moving the dual sets 37 and 39 of bars 40 and sliding rails 42 is similar to the one described in connection with the single set of bars 40 and sliding rails 42, to the exception that distinct sets of cams should be provided on the rotating shaft 52 for producing the upward and downward movements of the sliding rails 42 of the first 37 and second set 39. Once again, it will be understood that upward and downward movement of the movable supports, without pivoting, could be provided instead of the pivoting movements described above.

Single Set of Housings With Extendible Rods

Figure 4A:
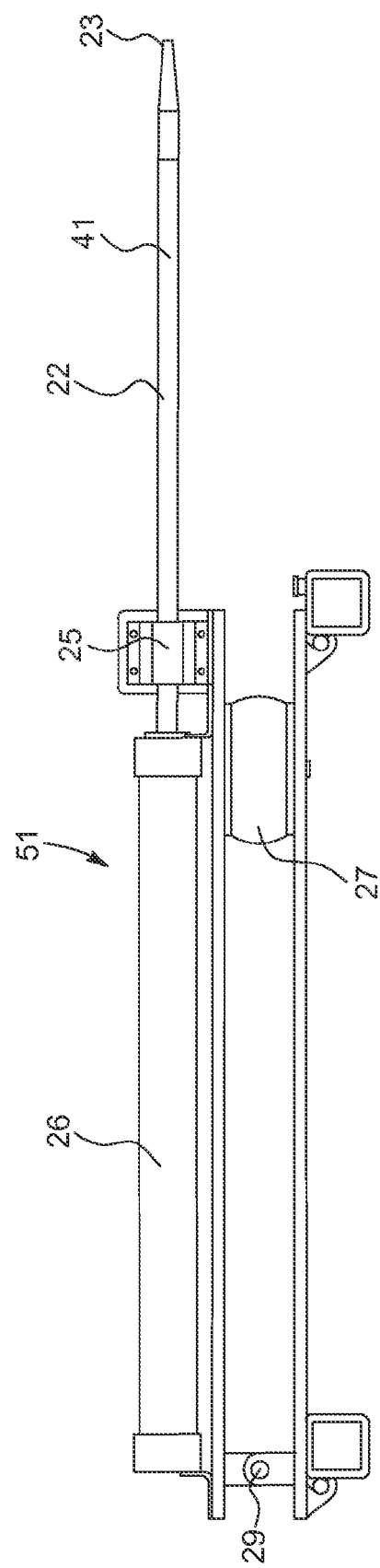
FIG. 4a is a close-up view of a housing and rod-shaped arm, shown in a downward extended position.
Figure 4B:
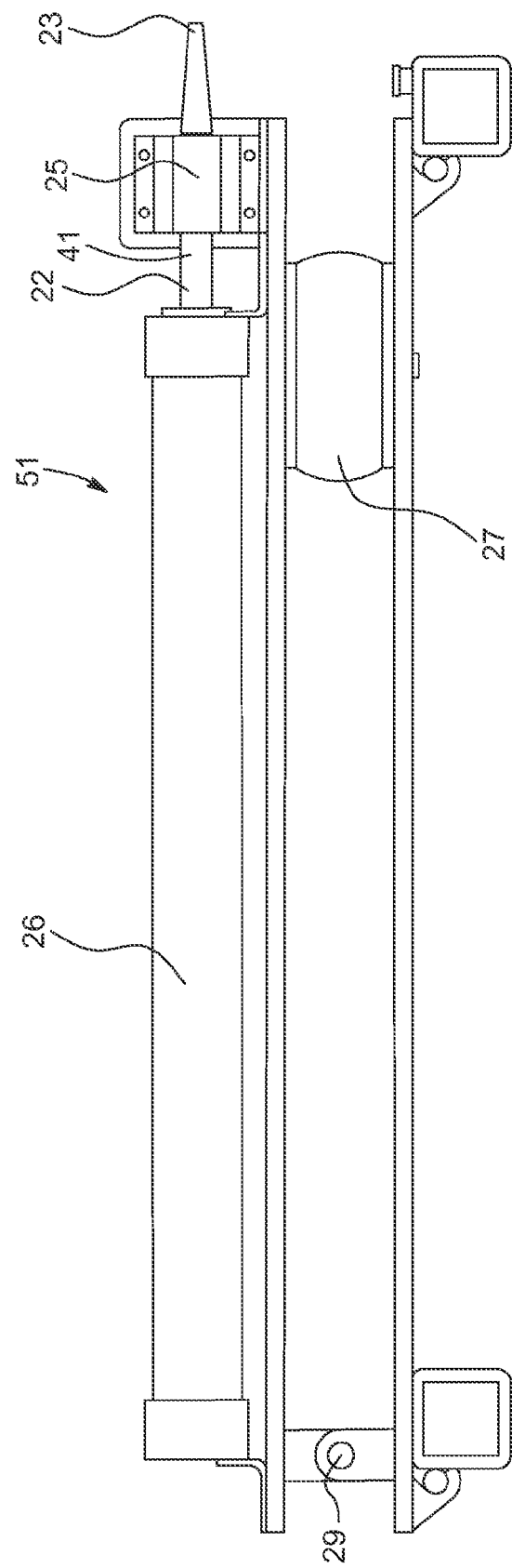
FIG. 4b is a close-up view of a housing and rod-shaped arm, shown in a downward retracted position.

In another embodiment illustrated on FIGS. 4*a* and 4*b*, the movable support 20 may be embodied by a single set of at least two housings 51, wherein each housing 51 has an extendible rod 41 therein forming a corresponding one of the arms 22 (only one housing 51 and corresponding extendible rod 41 is shown in the Figures). In this embodiment, the power assembly is an actuator 26 located within the housing which allows each of said rods 41 to move longitudinally in and out of its corresponding housing 51. The actuator could be any mechanism which drives the rods 41 longitudinally, such as, without being limitative, a pneumatic cylinder, a hydraulic cylinder, an electric cylinder or the like.

Preferably, an arm guide 25 is also provided for every rod 41, in order to provide enhanced vertical stability to the rod 41, and to maintain their alignment with the housing 51. The arm guide 25 can be defined as a fixed structure having a hollow section matching the shape of the rod 41 and being perfectly in line with its trajectory. It is preferably located close to the exit point of the rod 41 from the housing 51. In the course of its movement, the rod 41 traverses the guide 25, the latter creating no interference with the movement of the rod 41.

The extendible rods 41 are repeatedly extended from housings 51 and retracted into housings 51 in order to execute the layer stacking routine. Firstly, the power assembly moves the extendible rods 41 to the extended position, as can be seen on FIG. 4*a*, in order to reach the above described positioning step. Once again, in the positioning step the rods 41 are evenly levelled with the dispensing mechanism 30 in order to allow the transfer of the boards from the dispensing mechanism 30 to the movable support 20. One skilled in the art will once again understand that in this context, the expression "evenly levelled" need not refer to a perfect alignment between the dispensing mechanism and the extendible rods 41, and that the rods 41 could have a slight downward or upward inclination and/or be slightly below the level of the dispensing mechanism 30.

The extendible rods 41 are subsequently maintained in place during the dispensing step, while the boards are dispensed, from the dispensing mechanism 30, onto the rods 41. Once the new layer has been entirely dispensed thereon, the arms are moved to the retracted position, shown on FIG. 4*b*, achieving the above described dropping step.

Similarly to the bars 40 mounted on slide rails 42, in an embodiment, the housings 51 are pivotally mounted on the apparatus 10 to allow the execution of the three additional steps of the stacking routine. The pivotal capabilities are provided by each cylinder being pivotally mounted to a fixed surface using a pivot 29 at the extremity opposite to the exit of the extendible rod 41, and to a moving mechanism 27 at the extremity next to the exit of the extendible rod 41. This moving mechanism 27 can be a cam, a cylinder, a balloon or any other mechanisms that can force the cylinder upward and downward. The pivotal capabilities of the housings 51, combined with the longitudinal movement of the extendible rod 41 in and out of the housings allow the execution of the three base steps as well as the three additional steps of the stacking routine.

The upward pivoting of the housings 51 prior to the rods 41 being extended outside, in the forward movement, offers the same advantages previously described in connection with the upward pivoting of the slide rails, in that it allows a greater stacking rate by decreasing the contact possibilities between the receiving end 23 of the rods 41 and the top layer of the stack 14 and allows the receiving end 23 of each rod 41 to be lowered onto the abutment member to be positioned in the receiving position.

Once again it will be understood that, upward and downward movement of the housings 51, without varying the angle thereof, could be provided instead of the upward and downward pivoting, without departing from the scope of the present invention.

The movements of actuator 26, as well as that of each moving mechanism 27, are also synchronized to allow the extendible rods 41 to move as a single support during the execution of the stacking routine.

As will be easily understood by one skilled in the art, the expressions "extendible rods", "rods" and "rod-shaped arm" are used herein to describe arms having an elongated configuration and should not be interpreted to be limitative to arms having a rounded configuration.

Dual Set of Housing With Extendible Rods

Similarly to the above embodiment where a dual set of bars 40 on slide rails 42 were provided, in one embodiment, the movable support could be embodied by two sets of pivotal housings 51, wherein each housing 51 receives an extendible rod-shaped arm 22 therein. Each set of set of pivotal housing 51 would be similar to the housing set having pivotal capabilities described above, and would be provided with an actuator 26 located within the housing which allows each of said rods 41 to move longitudinally in and out of its corresponding housing 51. Once again it will be understood that the actuator could be any mechanism which drives the rods 41 longitudinally, such as, without being limitative, a pneumatic cylinder, a hydraulic cylinder, an electric cylinder or the like.

Figure 4C:
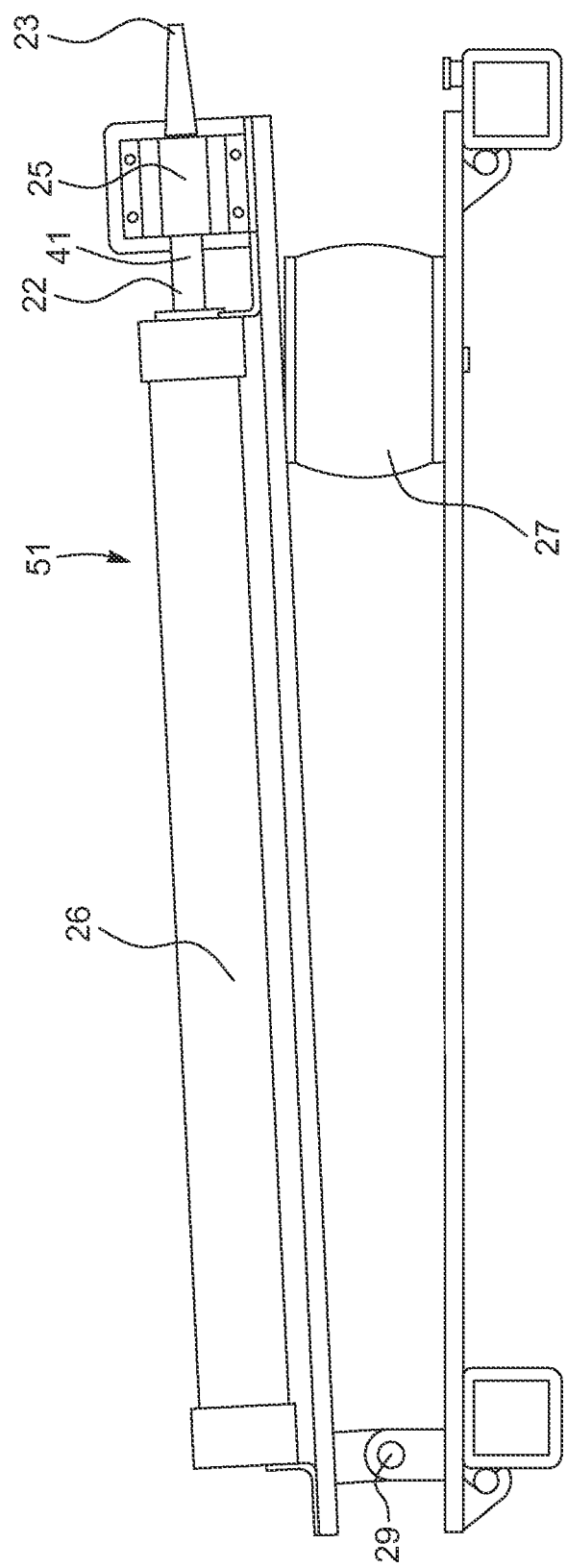
FIG. 4c is a close-up view of a housing and rod-shaped arm, shown in an upward retracted position.
Figure 4D:
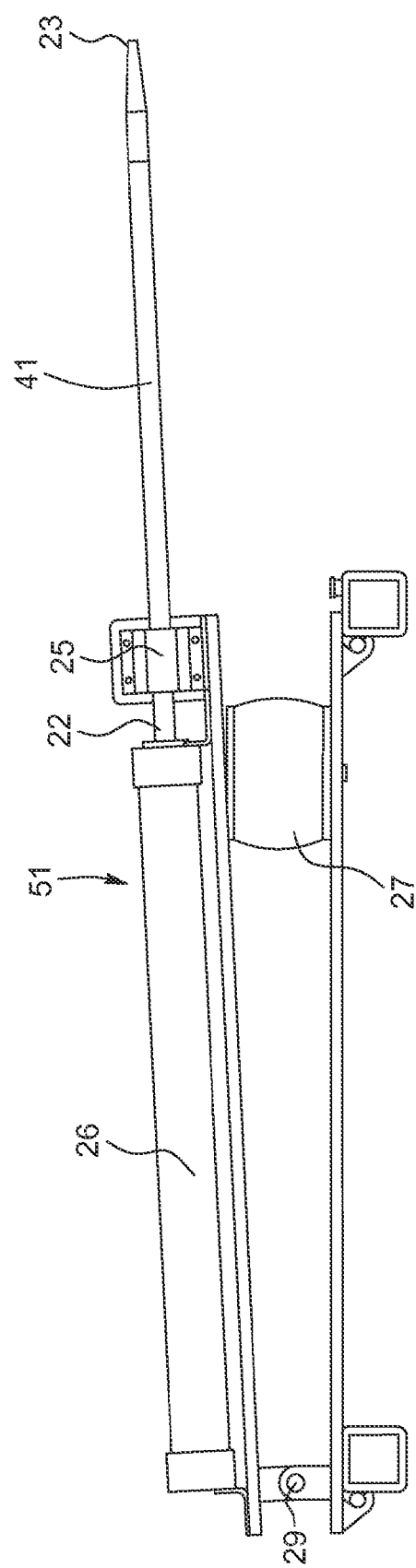
FIG. 4d is a close-up view of a housing and rod-shaped arm, shown in an upward extended position.

In this embodiment, the possible positions for the extendible rod 41 of each set of housings 51 are the downward extended position (shown on FIG. 4a), the downward retracted position (shown on FIG. 4b), the upward retracted position (shown on FIG. 4c), and the upward extended position (shown on FIG. 4d). These positions are successively adopted by the rods 41 of each set of housings 51 in an alternative manner, which results in both sets of housings executing the full layer stacking routine alternatively.

Once again, the stacking routine of each set of extendible rods 41 and housings 51 is similar to that of a single set, to the exception that the two sets of extendible rods 41 and housings 51 operate alternatively. Therefore, when a first set of extendible rods 41 is in the receiving position, as can be seen on FIG. 4a, the second set of extendible rods 41 is in the upward extended position, seen on FIG. 4d. After the rearward movement of the first set of extendible rods 41, the second set of extendible rods 41 is set to the receiving position and the first set of extendible rods 41 is set to the upward extended position. The stacking routine will therefore be similar to the one described in connection with the two sets of bars 40 and sliding rails 42.

The explanations given above pertaining to the power assembly and the arm guide 25 apply verbatim to this embodiment as well, and do not need to be repeated herewith.

Single and Dual Fork

Figure 5A:
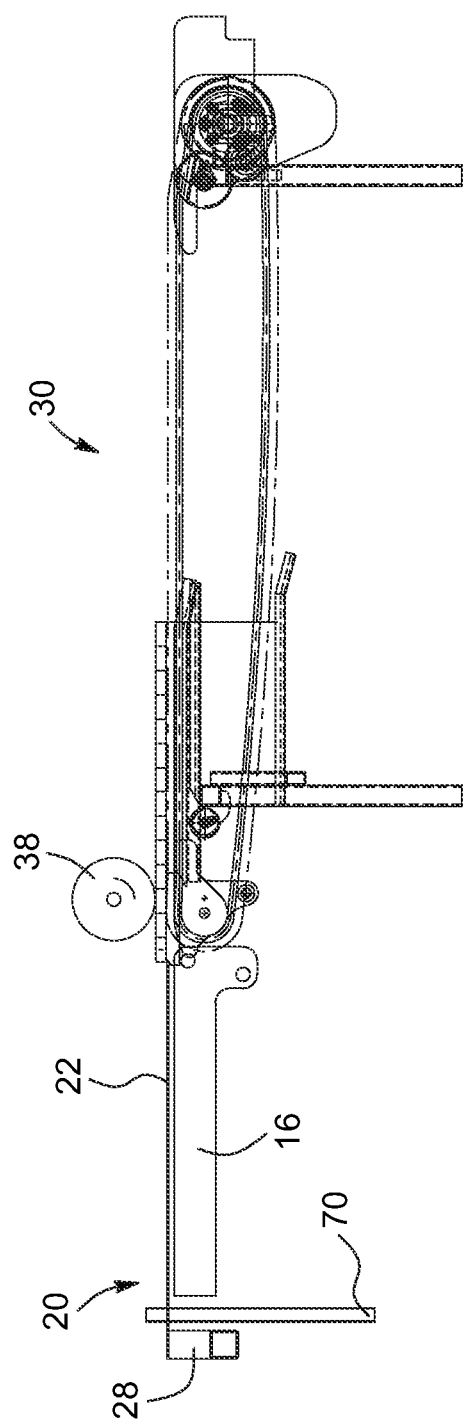
FIG. 5a is a side view of a board stacking apparatus according to another embodiment of the invention, wherein the movable support, hereby embodied by a fork, is in a forward position.
Figure 5B:
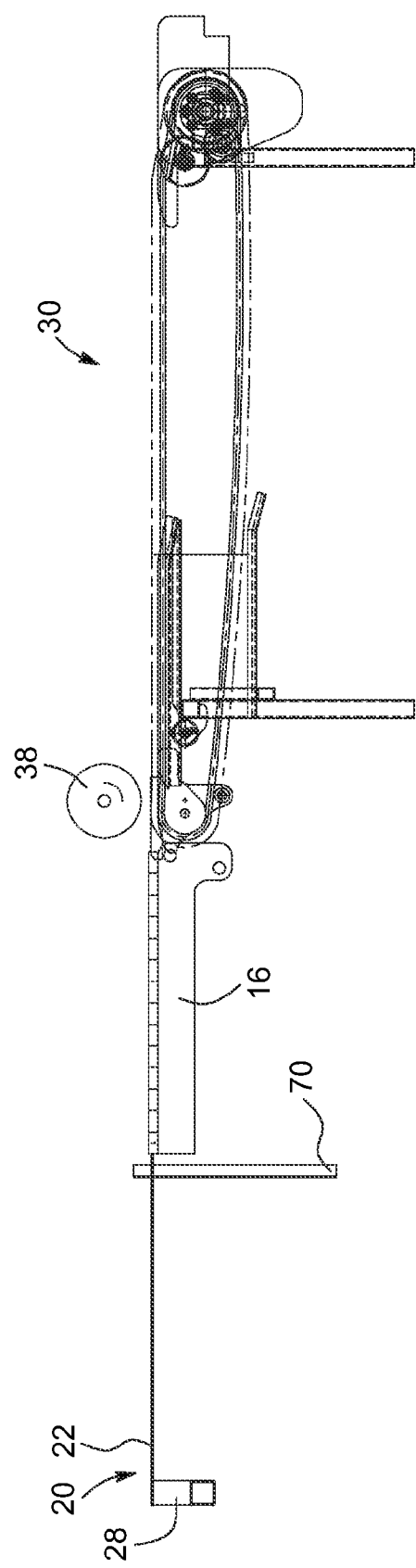
FIG. 5b is a side view of the board stacking apparatus of FIG. 5a, wherein the fork is in a rearward position.

According to another alternative embodiment, and as better illustrated on FIGS. 5a and 5b, the movable support 20 can be embodied by arms grouped together in a single fork 28 and movable between a forward position (shown on FIG. 5a), for the above-described positioning and dispensing step, and a rearward position (shown on FIG. 5b), for the above-described dropping step. The fork 28 is understood to be a structure made of sturdy and durable material such as, but not limited to, steel, wherein the arms (which can be of a variable amount) are physically grouped in order to act as a whole.

The power assembly used for the displacement of the fork 28 is preferably embodied by a motor having a crankshaft, a crank arm and a connection arm made of a sturdy and durable material such as steel. According to this embodiment, the crank arm is affixed at a first end to the crankshaft of the motor and is pivotally connected at a second end with the first end of the connection arm. The second end of the connection arm is pivotally connected to the fork. The arrangement described above allows the forward and backward movements of the fork 28, as a result of the rotation of the crankshaft by the motor, the rotation of the crankshaft preferably being constant in direction, either clockwise or counter clockwise.

Figure 6:
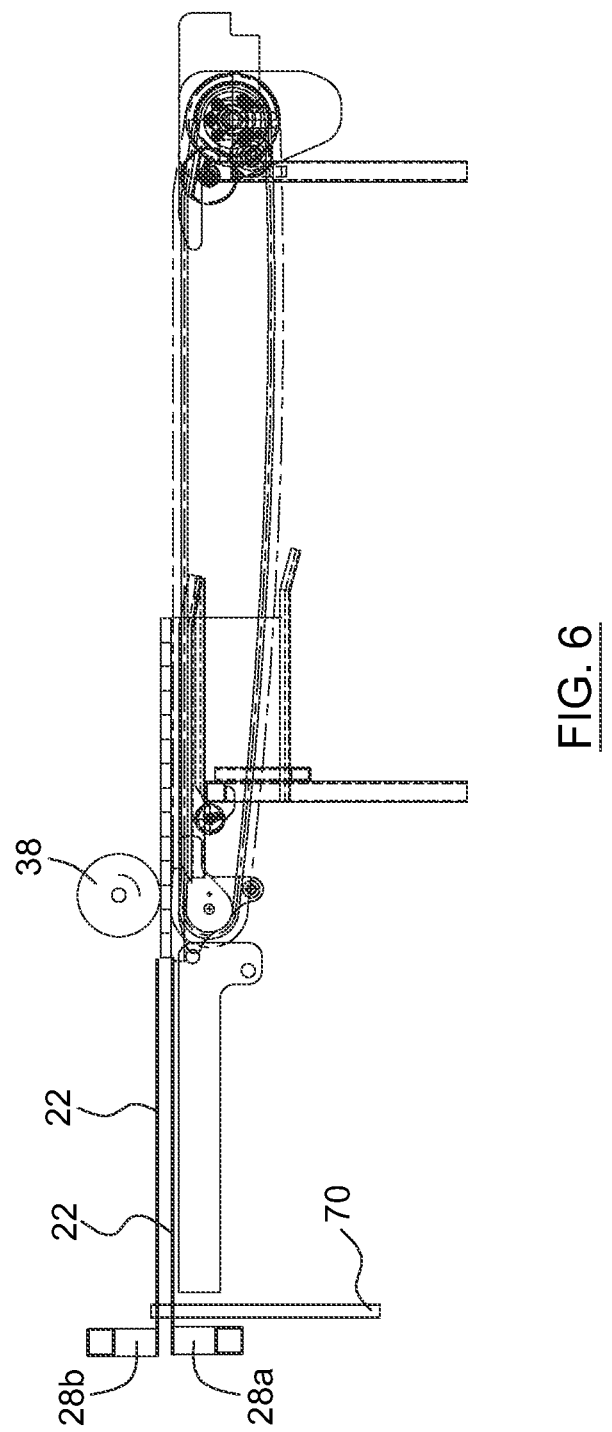
FIG. 6 is a side view of the board stacking apparatus according to yet another embodiment of the invention, wherein a pair of movable supports, hereby embodied by forks, are shown in a forward position.

In another embodiment, and as better illustrated on FIG. 6, the movable supports can also be embodied by a pair of forks 28a, 28b movable between a downward forward position, a downward rearward position, an upward rearward position and an upward forward position (the forks being shown respectively in the downward forward position and upward forward position on FIG. 6). The forks 28a, 28b each transit successively between the possible positions, to execute the layer stacking routine alternatively. As was the case for other embodiments where two sets of movable supports were provided, and as shown on FIG. 6, when a first fork 28a is in the downward forward position, the second fork 28b is set to the upward forward position. After the rearward movement of the first fork 28a, the second fork 28b is set to the downward forward position and the first fork is subsequently set to the upward forward position.

The forks 28a and 28b could each be similar to the single fork previously described, where the arms 22 of each fork 28a, 28b are positioned according to different vertical axis, so that there is no interference in the vertical movement of the forks.

Additional Features

In an embodiment, whenever several distinct arms 22 operate together in a synchronized manner to act as a movable support 20, the set of active arms used for stacking, could include only a subset of all available arms 22. Therefore at least two arms 22 of the movable support 20 may be used to form an active arms subset, while at least one arm 22 of the movable support 20 may be used to form an inactive arms subset. The active arms subset would be used to execute the stacking routine while the inactive arms subset would remain motionless, in a position away from the stack during the stacking routine.

Such an embodiment would be advantageous for providing more versatility to a stacker by allowing more arms 22 to be used for stacking longer boards 11 and fewer arms 22 for stacking shorter boards 11. Similarly, an intermediate arm may be useful when stacking boards with low rigidity, while the intermediate arm may not be necessary for boards of the same length, but with a greater rigidity. This embodiment may be possible for both the single movable support configuration and the dual movable support configuration. In all cases, the selected subset encompasses the arms which are appropriate for the given length.

For example, as can be seen on FIG. 2, in an embodiment where the movable support is embodied by a single set of bars 40 and sliding rails 42, all the bars 40', 40" and 40'" could be used for longer boards, while only bars 40' and 40" could be used for shorter boards. Similarly, bars 40', 40" and 40'" could be used for boards of a certain length with a low rigidity, while bars 40' and 40'" could be used for boards of the same length having a greater rigidity.

In the presented embodiments, the arms 22 of a movable support 20 are preferably disposed in such a way that accommodates the most common board lengths used on a particular stacker. In an embodiment, the arms 22 could be located at an equal distance from one another, the spacing being constant between all of the arms 22. However, a different configuration could be used in order to accommodate a wider range of board lengths.

In an embodiment, the vertical movement of the stack holder 16, the dispensing mechanism 30 and the movable support 20, through the action of the power assembly, is controlled by an electronic control system, to facilitate the synchronization of each component. Alternatively, an electronic control system can also be used for the coordination of the movement of several additional components involved in the stacking process, for example the selection of the arms forming the active set of arms, at a given time. Arm selection would preferably depend on the length and the rigidity of the boards to be stacked at the particular point in time.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the scope of the invention as defined in the appended claims.

The invention claimed is:

1. A board stacking apparatus for stacking a plurality of board layers into a stack supported by a stack holder, the stack having a front edge and a rear edge, each of the board layers being formed of a finite number of boards dispensed in a side-by-side configuration by a board dispensing mechanism adjacent the front edge of the stack, the board stacking apparatus comprising:
   a movable support having at least two arms sized to span a length of the stack between the rear and front edges thereof, each of the at least two arms having a receiving end;
   a rear stopper extending vertically in line with the rear edge of the stack;
   an abutment component associated with each of the at least two arms of the movable support, each abutment component being located proximate to and below the board dispensing mechanism and comprising a support member engageable with the receiving end of the associated arm and movable between an upper configuration and a lower configuration;
   a power assembly operatively connected to the movable support and the abutment components to move the movable support according to a layer stacking routine for stacking a corresponding one of the board layers onto the stack holder, the layer stacking routine comprising:
   a) positioning the abutment components in the upper configuration and the movable support at a receiving position wherein the at least two arms extend across and immediately above the stack and the receiving end thereof extend proximate and evenly levelled with the board dispensing mechanism and are supported by the support member of the associated abutment component;
   b) maintaining the movable support in the receiving position while the board dispensing mechanism dispenses the boards of the corresponding one of the board layers thereon, until a first dispensed board of the board layer engages the rear stopper; and
   c) moving the support member of the abutment components in the lower configuration and moving the movable support in a rearward direction to slide the movable support from under the board layer, thereby dropping the board layer onto the stack.

2. The board stacking apparatus of claim 1, wherein following step c) of the layer stacking routine, the layer stacking routine further comprises:
   a) pivoting the movable support upwardly;
   b) moving the movable support in a forward direction, above the stack; and
   c) pivoting the movable support downwardly, to position the movable support in the receiving position.

3. The board stacking apparatus of claim 1, wherein the movable support is composed of a set of at least two bars forming the arms, each bar being operatively connected to a slide rail and the set of bars repeatedly moving forward and backward on the slide rails to execute the layer stacking routine.

4. The board stacking apparatus of claim 2, wherein the movable support is composed of a set of at least two bars forming the arms, each bar being operatively connected to a pivotable slide rail, the slide rails being repeatedly pivoted upward and downward and the set of arms repeatedly moving forward and backward on the slide rails to execute the layer stacking routine.

5. The board stacking apparatus of claim 1, wherein the movable support is composed of a set of at least two housings each having an extendible rod therein forming one of the arms, and an actuator repeatedly extending the rods from the housings and retracting the rods into the housings in order to execute the layer stacking routine.

6. The board stacking apparatus of claim 2, wherein the movable support is composed of a set of at least two pivotable housings having an extendible rod therein forming one of the arms and an actuator repeatedly extending the rods from the housings and retracting the rods into the housings, the housings being repeatedly pivoted upward and downward and the extendible rods being repeatedly extended from the housings and retracted into the housings in order to execute the layer stacking routine.

7. The board stacking apparatus of claim 1, wherein a first subset comprising at least two arms of the movable support forms an active arms subset, while a second subset comprising at least one arm of the movable support forms an inactive arms subset, the active arms subset executing the stacking routine while the inactive arms subset remain motionless, in a position away from the stack.

8. The board stacking apparatus of claim 1, wherein the movable support is a fork, the fork being moved forward and backward in order to execute the layer stacking routine.

9. The board stacking apparatus according to claim 1, wherein each abutment component comprises a roller supporting the receiving end of the corresponding one of said arms when the the corresponding one of said arms is in the receiving position.

10. The board stacking apparatus according to claim 1, wherein each abutment component comprises:
    an actuation mechanism moving the support member in synchronization with the stacking routine.

11. The board stacking apparatus according to claim 10, wherein:
    the support member has an elongated shape and has a pivotally mounted pivot end and an opposite engagement end; and
    the actuation mechanism comprises a cam assembly operable to pivot the support member about the pivot end thereof.

12. The board stacking apparatus according to claim 11, wherein the cam assembly is electrically connected to the power assembly.

13. The board stacking apparatus according to claim 1, in combination with the board dispensing mechanism, wherein the board dispensing mechanism comprises:
    a bottom motion member having an entry end and an exit end, the exit end being adjacent the front edge of the stack; and
    a top motion member;
    wherein the bottom motion member spans across a finite length and the top motion member extends over a portion of the length of the bottom motion member located proximate to the exit end.

14. The board stacking apparatus and board dispensing mechanism combination of claim 13, wherein the top motion member is one of a rubber wheel or a hold down shoe.

15. The board stacking apparatus of claim 1, in combination with the stack holder, wherein the stack holder is vertically movable in conjunction with the movable support so as to lower the stack subsequently to the dropping of each board layer thereon.

16. A board stacking apparatus for stacking a plurality of board layers into a stack supported by a stack holder, the stack having a front edge and a rear edge, each of the board layers being formed of a finite number of boards dispensed in a side-by-side configuration by a board dispensing mechanism adjacent the front edge of the stack, the board stacking apparatus comprising:
 a pair of movable supports each having at least two arms sized to span a length of the stack between the rear and front edges thereof, the at least two arms of each movable support having a receiving end;
 a rear stopper extending vertically in line with the rear edge of the stack;
 an abutment component associated with each of the at least two arms of the movable support, each abutment component being located proximate and below the board dispensing mechanism and comprising a support member engageable with the receiving end of the associated arm and movable between an upper configuration and a lower configuration; and
 a power assembly operatively connected to the pair of movable supports and the abutment component to move the movable supports according to a layer stacking routine for stacking a corresponding one of the board layers onto the stack holder, the layer stacking routine comprising:
  a) positioning the abutment components in the upper configuration and one of the movable supports at a receiving position wherein the at least two arms thereof extend across and immediately above the stack and the receiving end thereof extend proximate and evenly levelled with the board dispensing mechanism and are supported by the support member of the associated abutment component;
  b) positioning the other one of the movable supports at an upper position wherein the at least two arms thereof extend over the one of the movable supports in a spaced apart relationship;
  c) maintaining the movable supports in the receiving and upper positions while the board dispensing mechanism dispenses the boards of the corresponding one of the board layers therebetween until a first dispensed board of the board layer engages the rear stopper; and
  d) moving the support member of the abutment components in the lower configuration and moving the one of the movable supports at the receiving position in a rearward direction to slide the support member from under the board layer, thereby dropping the board layer onto the stack;
  the power assembly positioning the movable supports of the pair of movable supports in the receiving and top positions in an alternating manner for the stacking of successive ones of the board layers.

17. The board stacking apparatus of claim 16, wherein the pair of movable support is composed of two sets of at least two bars forming the arms, each bar of each sets of bars being operatively connected to a pivotable slide rail, the slide rails of each set of bars being repeatedly pivoted upward and downward and the set of bars repeatedly moving forward and backward on the slide rails to execute the layer stacking routine.

18. The board stacking apparatus of claim 16, wherein the pair of movable supports is composed of two sets of at least two pivotal housings each having an extendible rod therein forming one of the arms and an actuator repeatedly extending the rods from the housings and retracting the rods into the housings, the pivotal housings being repeatedly pivoted upward and downward, and the extendible rods being repeatedly extended from the housings and retracted into the housings, in order to execute the layer stacking routine.

19. The board stacking apparatus of claim 16, wherein a first subset comprising at least two arms of one of the movable support forms a first active arms subset, a second subset comprising at least one arm of the other one of the movable support forms a first inactive arms subset, a third subset comprising at least two arms of the other one of the movable support forms a second active arms subset, and a fourth subset comprising at least one arm of the other one of the movable support forms a second inactive arms subset, the first and second active arms subsets executing the stacking routine while the first and second inactive arms subsets remain motionless in a position away from the stack.

20. The board stacking apparatus of claim 16, wherein the pair of movable supports is composed of two forks, the forks being repeatedly moved up, forward, down and backward in an alternating manner in order to execute the layer stacking routine.

21. The board stacking apparatus of claim 16, in combination with the board dispensing mechanism, wherein the board dispensing mechanism comprises:
 a bottom motion member having an entry end and an exit end, the exit end being adjacent the front edge of the stack; and
 a top motion member;
 wherein the bottom motion member spans across a finite length and the top motion member extends over a portion of the bottom motion member located proximate to the exit end.

22. The board stacking apparatus and board dispensing mechanism of claim 21, wherein the top motion member is one of a rubber wheel or a hold down shoe.

23. The board stacking apparatus of claim 16 in combination with the stack holder, wherein the stack holder is vertically movable in conjunction with the movable support so as to lower the stack subsequently to the dropping of each board layer thereon.

24. The board stacking apparatus according to claim 16, wherein each abutment component comprises a roller supporting the receiving end of the corresponding one of said arms when the the corresponding one of said arms is in the receiving position.

25. The board stacking apparatus according to claim 16, wherein each abutment component comprises:
 an actuation mechanism moving the support member in synchronization with the stacking routine.

26. The board stacking apparatus according to claim 25, wherein:
 the support member has an elongated shape and has a pivotally mounted pivot end and an opposite engagement end; and
 the actuation mechanism comprises a cam assembly operable to pivot the support member about the pivot end thereof.

27. The board stacking apparatus according to claim 26, wherein the cam assembly is electrically connected to the power assembly.

* * * * *